United States Patent [19]
Sato

[11] Patent Number: 6,148,611
[45] Date of Patent: Nov. 21, 2000

[54] ENGINE AIR-FUEL RATIO CONTROLLER AND CONTROL METHOD

[75] Inventor: Ritsuo Sato, Yokohama, Japan

[73] Assignee: Nissan Motor Co., Ltd., Yokohama, Japan

[21] Appl. No.: 09/239,957

[22] Filed: Jan. 29, 1999

[30] Foreign Application Priority Data

Jan. 29, 1998 [JP] Japan .................................. 10-016867
Mar. 12, 1998 [JP] Japan .................................. 10-061802

[51] Int. Cl.$^7$ ..................................................... F01N 3/00
[52] U.S. Cl. ............................... 60/274; 60/276; 123/489
[58] Field of Search ............................ 60/272, 273, 274, 60/276, 285; 123/489, 674, 675, 493, 325; 701/104

[56] References Cited

U.S. PATENT DOCUMENTS

| | | | |
|---|---|---|---|
| 4,216,653 | 8/1980 | Nakase et al. .............................. | 60/276 |
| 4,805,578 | 2/1989 | Kikuchi et al. .......................... | 123/489 |
| 5,379,586 | 1/1995 | Honji et al. ................................ | 60/276 |
| 5,758,631 | 6/1998 | Teraoka ..................................... | 123/674 |
| 5,941,211 | 8/1999 | Brehob et al. ........................... | 123/325 |
| 5,988,144 | 11/1999 | Yoshioka et al. ........................ | 123/493 |

FOREIGN PATENT DOCUMENTS 8-193537 7/1996 Japan .

*Primary Examiner*—Tu Ba Hoang
*Attorney, Agent, or Firm*—Foley & Lardner

[57] ABSTRACT

When an engine (1) is in an idle state and the engine rotation speed exceeds a predetermined value, fuel supply is stopped. In this state, fuel supply is resumed when there is a shift to a non-idle state or when the engine rotation speed falls below a predetermined value. The oxygen adsorption amount of a three-way catalyst during the time period when fuel supply is stopped, is calculated. The air-fuel ratio is made richer according to the oxygen adsorption amount of the three-way catalyst when fuel supply is resumed. By limiting the richness of the air-fuel ratio at this time, fluctuations of engine output torque in the idle running state are suppressed.

18 Claims, 18 Drawing Sheets

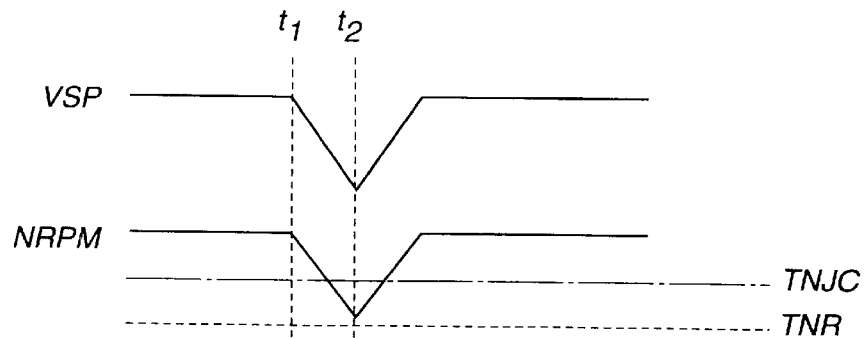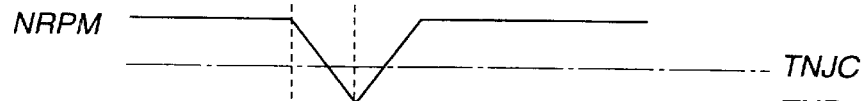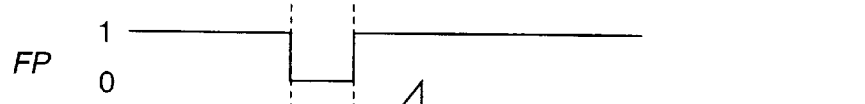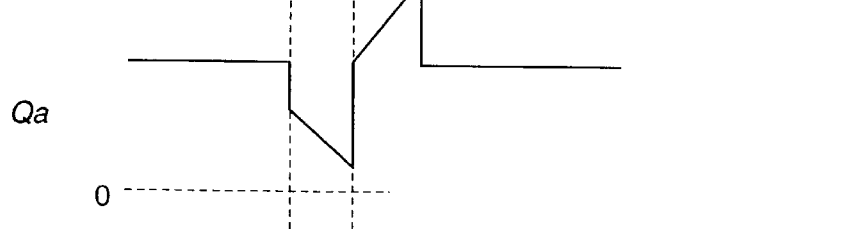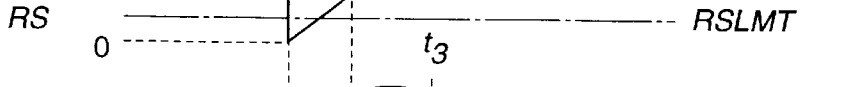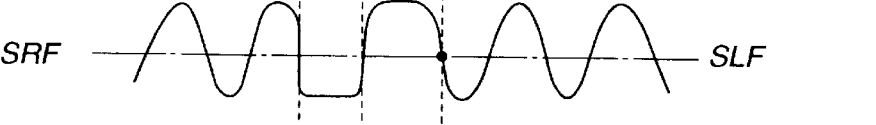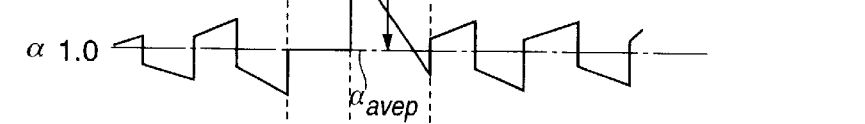

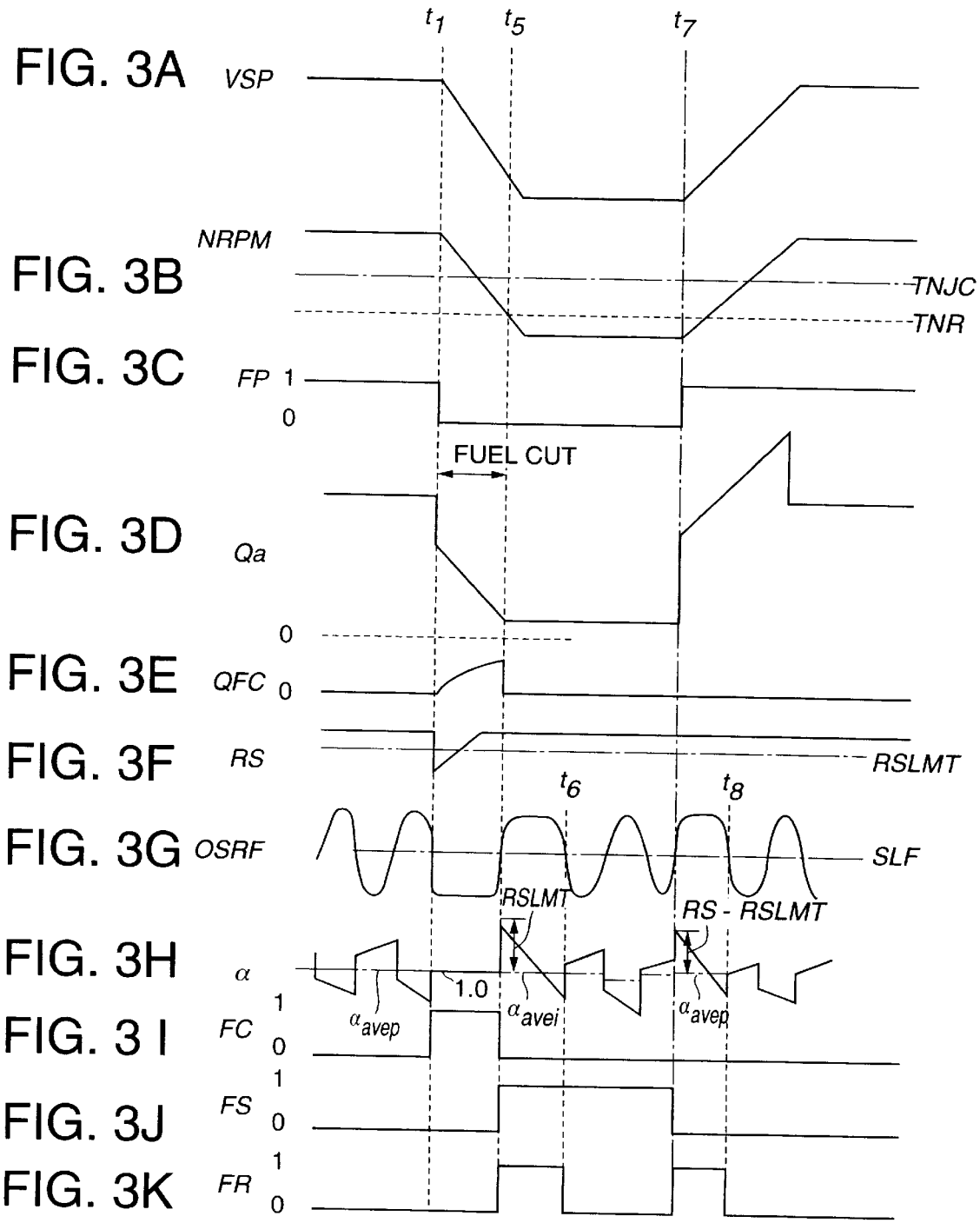

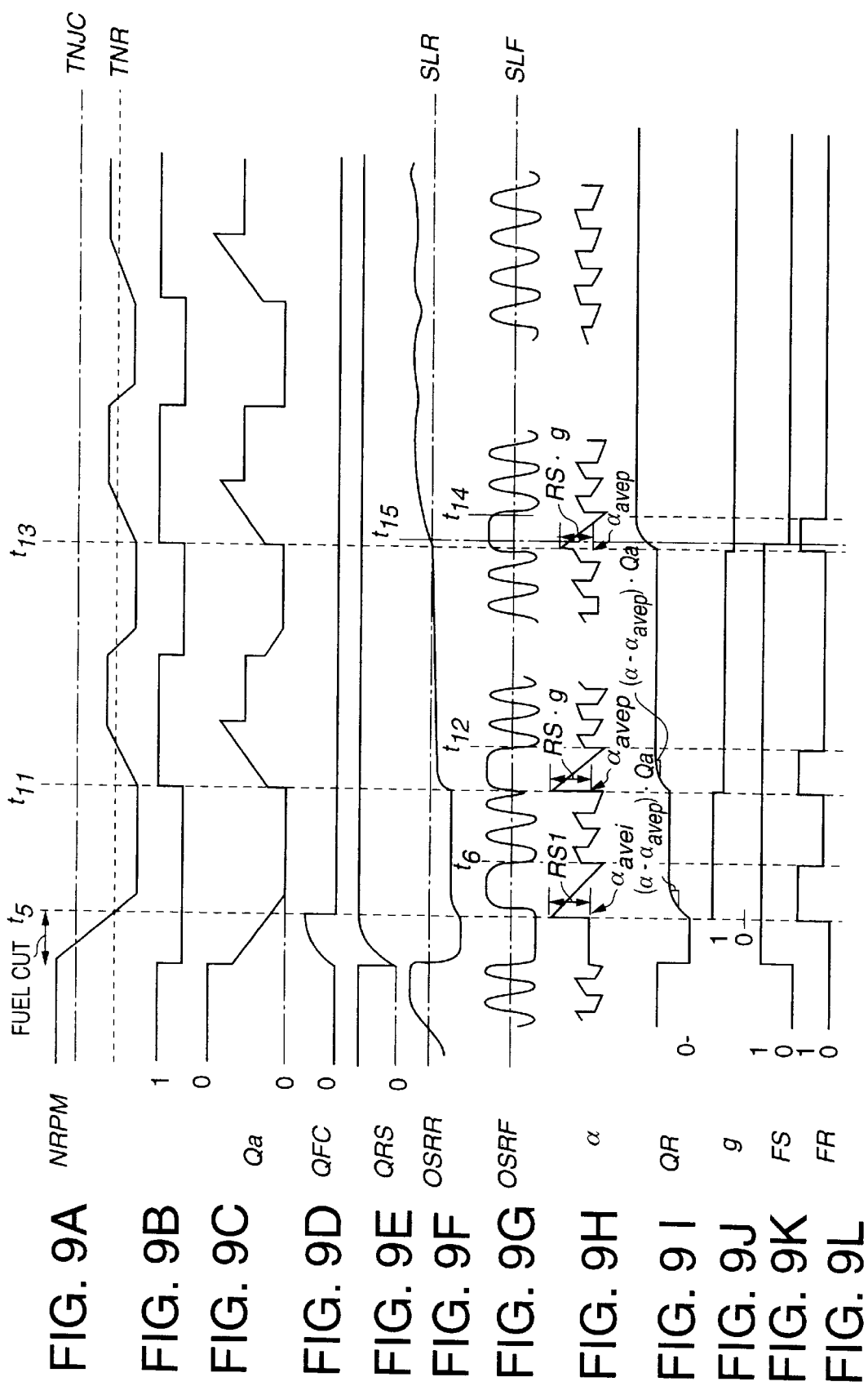

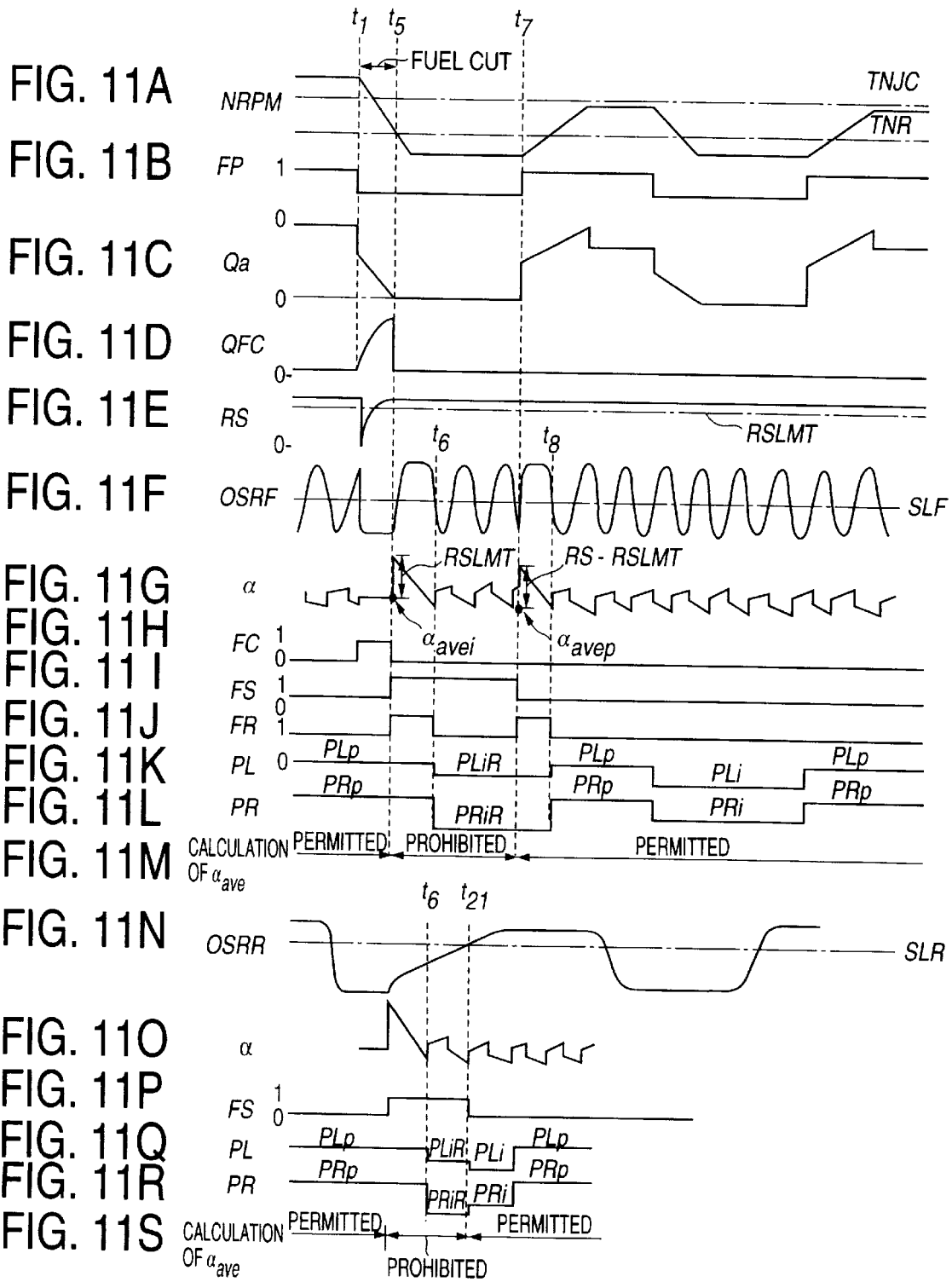

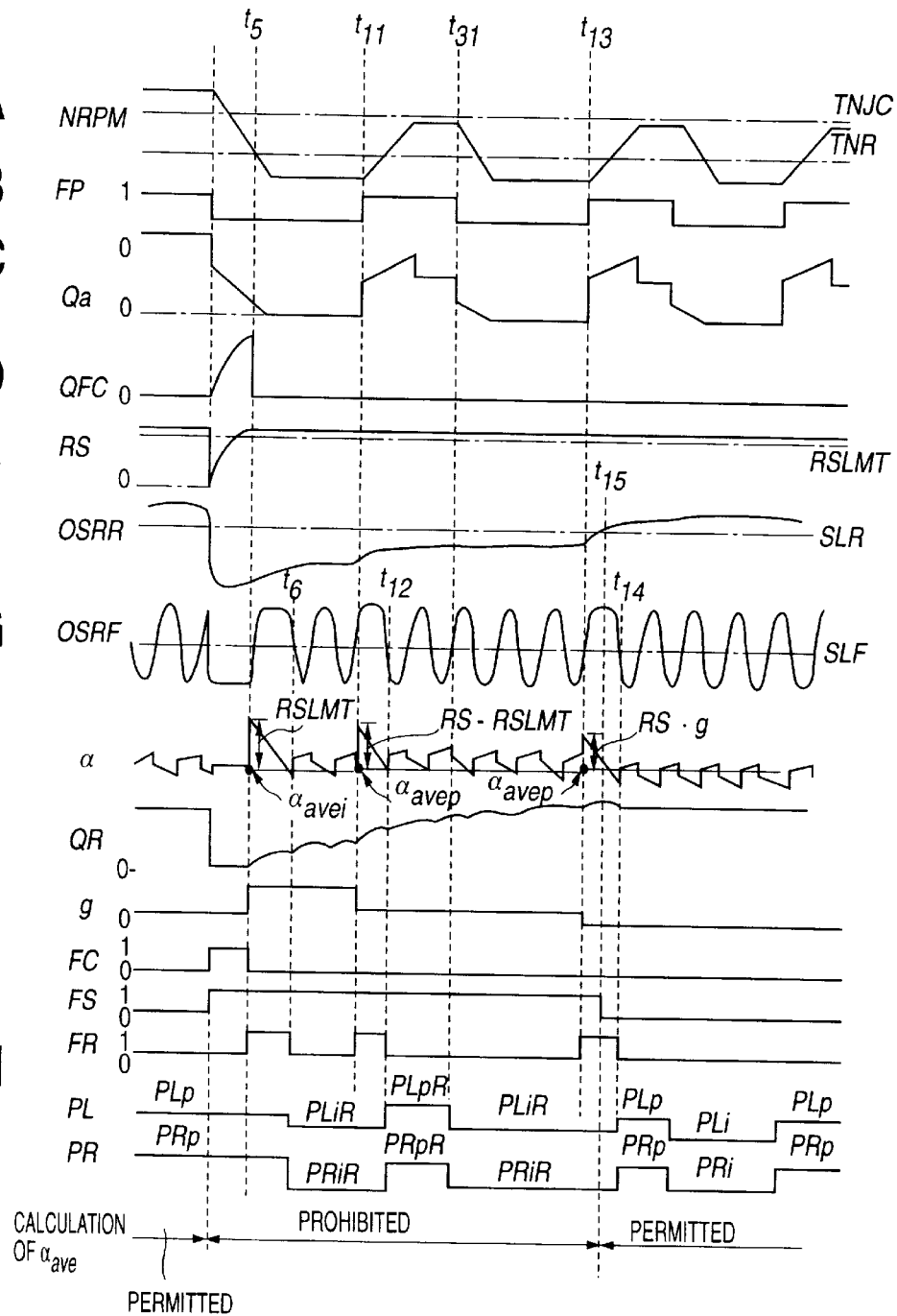

ENGINE AIR-FUEL RATIO CONTROLLER AND CONTROL METHOD

FIELD OF THE INVENTION

This invention relates to air-fuel ratio control of an internal combustion engine.

BACKGROUND OF THE INVENTION

A three-way catalyst which performs purification of the exhaust gases from a vehicle engine oxidizes carbon monoxide (CO) and hydrocarbons (HC), and reduces nitrogen oxides (NOx).

The oxygen used to oxidize CO and HC comes from a small amount of excess oxygen contained in combustion gases, and oxygen produced by reduction of NOx.

In a vehicle engine, so-called fuel cut is performed where the fuel supply to the engine is cut off under predetermined deceleration conditions. When fuel cut is performed, intake air is discharged in the exhaust gases and is not burnt. As a result, oxygen which sharply increases in the exhaust gases is adsorbed by the three-way catalyst, and an excess oxygen state continues in the three-way catalyst for some time after fuel cut is terminated. In this excess oxygen state, reduction of NOx is not effective, and the amount of NOx discharged increases.

Tokkai Hei 8-193537 published by the Japanese Patent Office in 1996 discloses a technique wherein the air-fuel ratio is made richer than the stoichiometric air-fuel ratio for a very short time immediately after fuel cut is terminated. In this prior art technique, the intake air amount during fuel cut or the oxygen amount adsorbed by the three-way catalyst from the time of fuel cut is calculated, and a richness degree is determined based on the adsorbed oxygen amount.

When the driver steps on the accelerator pedal, fuel cut is terminated. Fuel cut is terminated also when the engine rotation speed has become lower than a predetermined value even if the driver does not step on the accelerator pedal.

After a long fuel cut, the fuel injection amount must be increased by at least 10% to suppress increase of the NOx discharge amount immediately after fuel cut is terminated. However, if such an increase of fuel injection amount occurs when the driver does not step on the accelerator pedal, it will result in an increase of engine output torque not intended by the driver.

SUMMARY OF THE INVENTION

It is therefore an object of this invention to suppress torque fluctuation while promoting discharge of excess oxygen adsorbed by a three-way catalyst when fuel injection is resumed due to a drop of engine rotation speed.

In order to achieve the above object, this invention provides an air-fuel ratio controller for use with an engine which performs combustion of a mixture of fuel injected from a fuel injector and air aspirated from an intake passage, wherein exhaust gas produced by combustion is purified by a catalytic converter comprising a three-way catalyst.

The controller comprises a sensor for detecting whether or not an engine is running in an idle state, a sensor for detecting a rotation speed of the engine 1, and a microprocessor. Herein, the idle state denotes the engine running state when the accelerator pedal is released irrespective of whether or not the vehicle is running. The microprocessor is programmed to stop fuel injection from the fuel injector when the engine is in the idle state and the engine rotation speed exceeds a predetermined fuel cut permitted rotation speed, calculate an oxygen amount adsorbed on the three-way catalyst while the injection has stopped, and increase the amount of fuel injected from the fuel injector when the fuel injection is resumed by an increase amount according to the adsorbed oxygen amount, and limit the increase amount to a predetermined limiting value.

This invention also provides an air-fuel ratio control method of an engine which performs combustion of a mixture of fuel injected from a fuel injector and air aspirated from an intake passage, wherein exhaust gas produced by combustion is purified by a catalytic converter comprising a three-way catalyst.

The method comprises detecting whether or not the engine is running in an idle state, detecting a rotation speed of the engine, stopping fuel injection from the fuel injector when the engine is in the idle state and the engine rotation speed exceeds a predetermined fuel cut permitted rotation speed, calculating an oxygen amount adsorbed on the three-way catalyst while the injection has stopped, increasing the amount of fuel injected from the fuel injector when the fuel injection is resumed, by an increase amount according to the adsorbed oxygen amount, and limiting the increase amount to a predetermined limiting value.

The details as well as other features and advantages of this invention are set forth in the remainder of the specification and are shown in the accompanying drawings.

BRIEF DESCRIPTION OF THE DRAWINGS

FIGS. 2A–2K are timing charts describing an air-ratio control performed by the air fuel ratio controller when an idle switch has switched from ON to OFF.

FIGS. 3A–3K are similar to FIGS. 2A–2K, but showing an air-fuel ratio control when an engine rotation speed has become low while the idle switch is ON.

FIGS. 9A–9L are timing charts describing the control performed by an air-fuel ratio feedback correction coefficient $\alpha$ according to a fourth embodiment of this invention.

FIGS. 11A–11S are timing charts describing the control performed by an air-fuel ratio controller according to the fourth embodiment.

FIGS. 13A–13P are timing charts describing the control performed by an air-fuel ratio controller according to the fifth embodiment.

DESCRIPTION OF THE PREFERRED EMBODIMENTS

Figure 1:
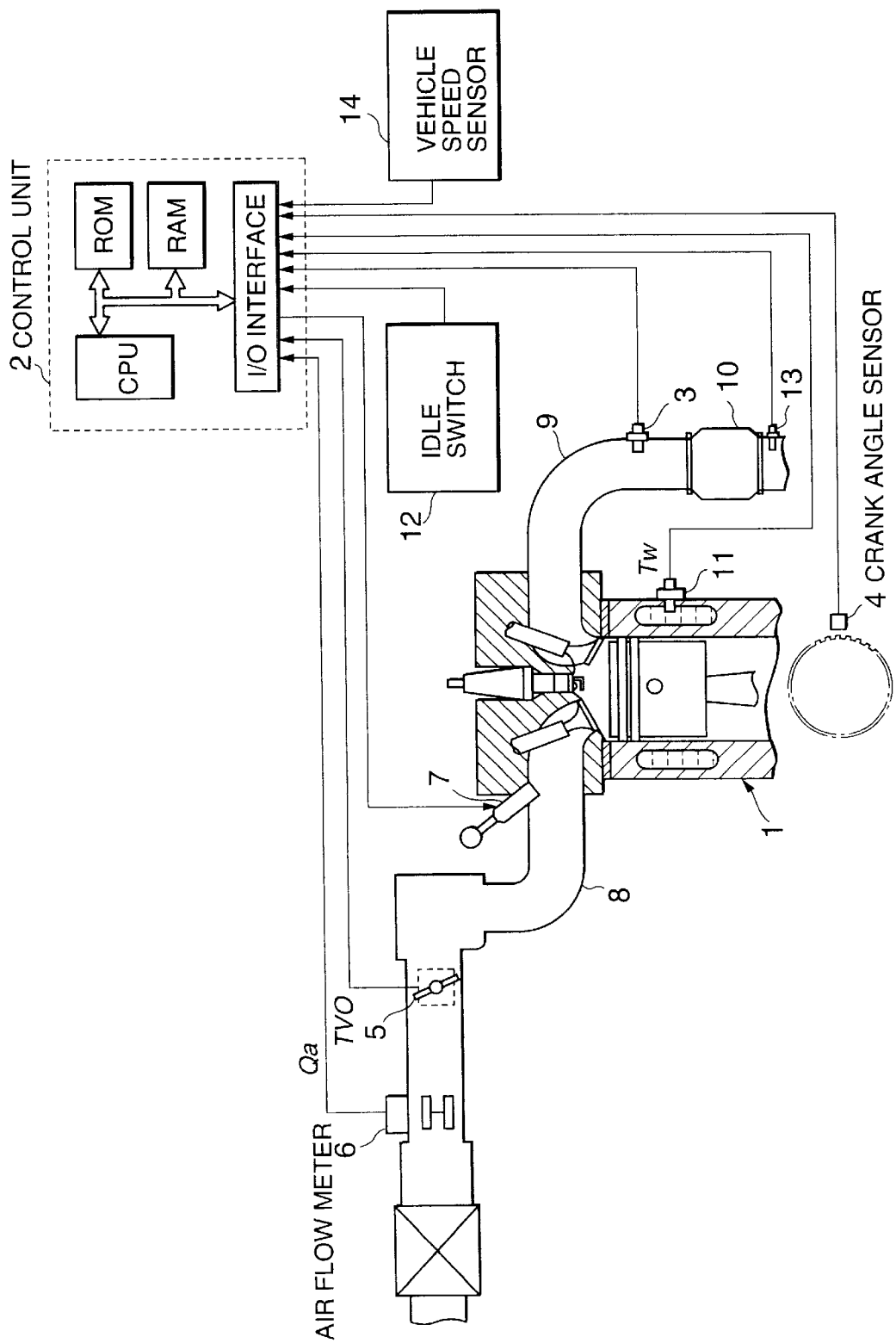
FIG. 1 is a schematic diagram of an air-fuel ratio controller according to this invention.

Referring to FIG. 1 of the drawings, an intake passage 8 and exhaust passage 9 are connected to a multi-cylinder engine 1 of a vehicle. The intake passage 8 is provided with a throttle 5 and a fuel injector 7. The throttle 5 operates in synchronism with an accelerator pedal of the vehicle. A catalytic converter 10 using a three-way catalyst is provided in the exhaust passage 9.

The fuel injector 7 injects fuel into the intake air of the engine 1 according to an injection signal from a control unit 2.

A REF signal corresponding to a reference rotation position for each cylinder of the engine 1, and a POS signal corresponding to a one degree rotation of the engine 1, are input from a crank angle sensor 4 to the control unit 2. A rotation speed NRPM of the engine 1 is calculated from an output signal from the crank angle sensor 4.

An intake air amount Qa detected by an air flow meter 6 provided in the intake passage 8, an engine cooling water temperature Tw detected by a water temperature sensor 11, and oxygen concentrations detected by oxygen sensors 3, 13 provided respectively upstream and downstream of the catalytic converter 10 in the exhaust passage 9, are input as signals to the control unit 2. The oxygen concentration detected by the oxygen sensor 3 varies according to the air-fuel ratio of the air-fuel mixture supplied to the engine 1. Therefore, the real air-fuel ratio can be determined from an output signal OSRF of the oxygen sensor 3. An output signal OSRR from the oxygen sensor 13 represents the oxygen concentration of the atmosphere in the catalytic converter 10.

Signals are also input to the control unit 2 from an idle switch 12 showing whether or not the engine 1 is in an idle state, a vehicle speed sensor 14 which detects a vehicle speed VSP, and a starter switch 15 which detects whether or not the engine 1 is being started up. Herein, the idle state denotes the engine running state when the accelerator pedal is released irrespective of whether or not the vehicle is running.

Based on these input signals, the control unit 2 computes an injection pulse width of the fuel injector 7. This injection pulse width corresponds to an injection continuation period of the fuel injector 7.

The control unit 2 comprises a microcomputer comprising a central processing unit CPU, read-only memory ROM, random access memory RAM and an output (I/O) interface.

When the air-fuel ratio of the air-fuel mixture supplied to the engine 1 is within a predetermined range centered on the stoichiometric air-fuel ratio, the three-way catalyst of the catalytic converter 10 processes NOx, HC and CO simultaneously with maximum conversion efficiency. The control unit 2 therefore feedback controls the injection pulse width of the fuel injector 7 based on an output signal from an oxygen sensor 3 so that the air-fuel ratio fluctuates with a certain frequency inside this range.

The control unit 2 performs fuel cut on the conditions that a signal from an idle switch 12 is ON, the engine rotation speed NRPM is equal to or greater than a fuel cut permitted rotation speed TNJC and the vehicle speed VSP is within a predetermined range.

When any of the following conditions is satisfied during fuel cut, fuel cut is terminated and fuel injection is resumed.

Condition 1: The accelerator pedal is depressed. This is detected by the fact that the idle switch 12 is OFF.

Condition 2: The engine rotation speed NRPM is less than a predetermined value TNR even if the idle switch 12 is ON.

When fuel cut is performed, a large amount of oxygen is adsorbed by the three-way catalyst of the catalytic converter 10. Even if fuel cut is terminated, the oxygen concentration in the converter 10 does not immediately return to the state before fuel cut, and an excess oxygen state continues for some time. In the excess oxygen state, reduction of NOx is not efficient.

The control unit 2 therefore calculates the oxygen adsorption amount on the three-way catalyst during fuel cut according to the intake air amount or fuel cut duration, and prevents increased discharge of NOx by making the air-fuel ratio richer according to the oxygen adsorption amount for a very short time immediately after fuel cut is terminated. This is identical to the aforesaid prior art.

However, according to this control algorithm, when fuel injection is resumed due to decrease of the engine rotation speed NRPM after a long fuel cut as described hereabove, an unintended output torque increase of the engine 1 occurs.

To avoid this situation, the control unit 2 controls the air-fuel ratio as follows.

First, a required richness RS is calculated according to the intake air amount during fuel cut. When the fuel cut is terminated due to decrease of the rotation speed NRPM of the engine 1, a fuel amount higher than a limiting value is not injected even if the required richness RS exceeds a limiting value RSLMT. The fuel which was not injected due to this limit is injected when the idle switch 12 switches OFF on the next occasion.

Next, this control will be described referring to FIGS. 2A–2K and FIGS. 3A–3K. FIGS. 2A–2K shows a case where fuel cut is terminated due to the idle switch 12 switching OFF.

When the idle switch 12 switches ON at a time $t_1$, fuel cut begins, and when the idle switch 12 switches OFF at a time $t_2$, fuel cut is terminated.

During fuel cut, an intake air amount Qa decreases linearly, and a cumulative intake air amount QFC after fuel cut starts, increases according to a second order curve.

Figure 5:
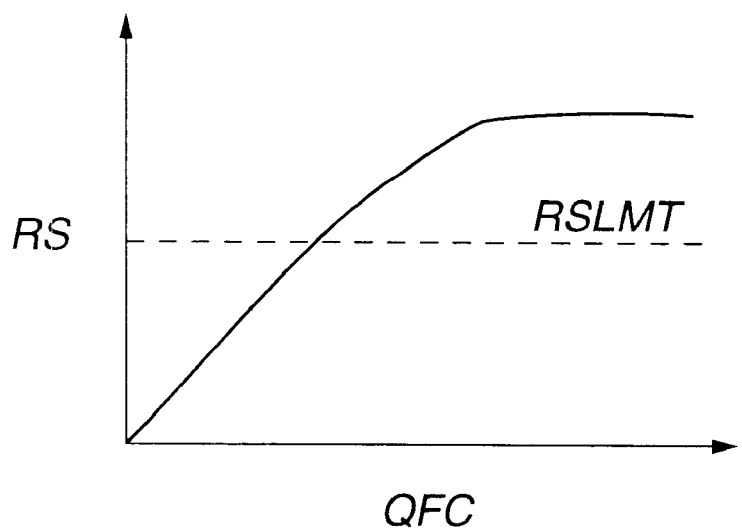
FIG. 5 is a diagram describing a table of required richness RS stored by the control unit.

The control unit 2 calculates the required richness RS by looking up a map shown in FIG. 5 based on the cumulative intake air amount QFC. This map is previously stored in the control unit 2. At the time $t_2$ when fuel cut is terminated, an air-fuel ratio feedback correction coefficient α is increased according to the required richness RS. Subsequently, α is decreased at a predetermined rate, and rich control of the air-fuel ratio is terminated at a time $t_3$ when an output signal OSRF of the oxygen sensor 3 coincides with a slice level SLF. The normal value of the air-fuel ratio feedback correction coefficient α is 1.0, and during normal air-fuel ratio feedback control, air-fuel ratio control is performed around a center value of α=1.0.

On the other hand, when fuel cut is terminated due to decrease of the rotation speed NRPM of the engine 1 while the idle switch 12 is ON, the required richness RS is compared with the limiting value RSLMT at a time $t_5$ when fuel cut is terminated as shown in FIGS. 3A–3K. If the required richness RS exceeds the limiting value RSLMT, the air-fuel ratio feedback correction coefficient α is increased in correspondence with the limiting value RSLMT instead of the required richness RS, and subsequently α is decreased at a predetermined rate. This rich control of the air-fuel ratio is terminated at a time $t_6$ when the output signal OSRF of the oxygen sensor 3 coincides with the slice level SLF.

The limiting value RSLMT is set to a level at which the driver does not experience torque shock even if air-fuel ratio rich control is performed.

Due to this limitation, the amount of HC and CO which consumes adsorbed oxygen on the three-way catalyst is insufficient. The required richness RS calculated at the time $t_6$ is stored in a memory and additional rich control is performed at a time $t_7$ when the accelerator pedal is depressed. This time, the air-fuel ratio feedback correction coefficient $\alpha$ is increased in correspondence with RS—RSLMT as shown in FIG. 3H. Subsequently, $\alpha$ is decreased at a predetermined rate, and this rich control is terminated at a time $t_8$ at which the output signal OSRF of the oxygen sensor 3 coincides with the slice level SLF.

Figure 4A:
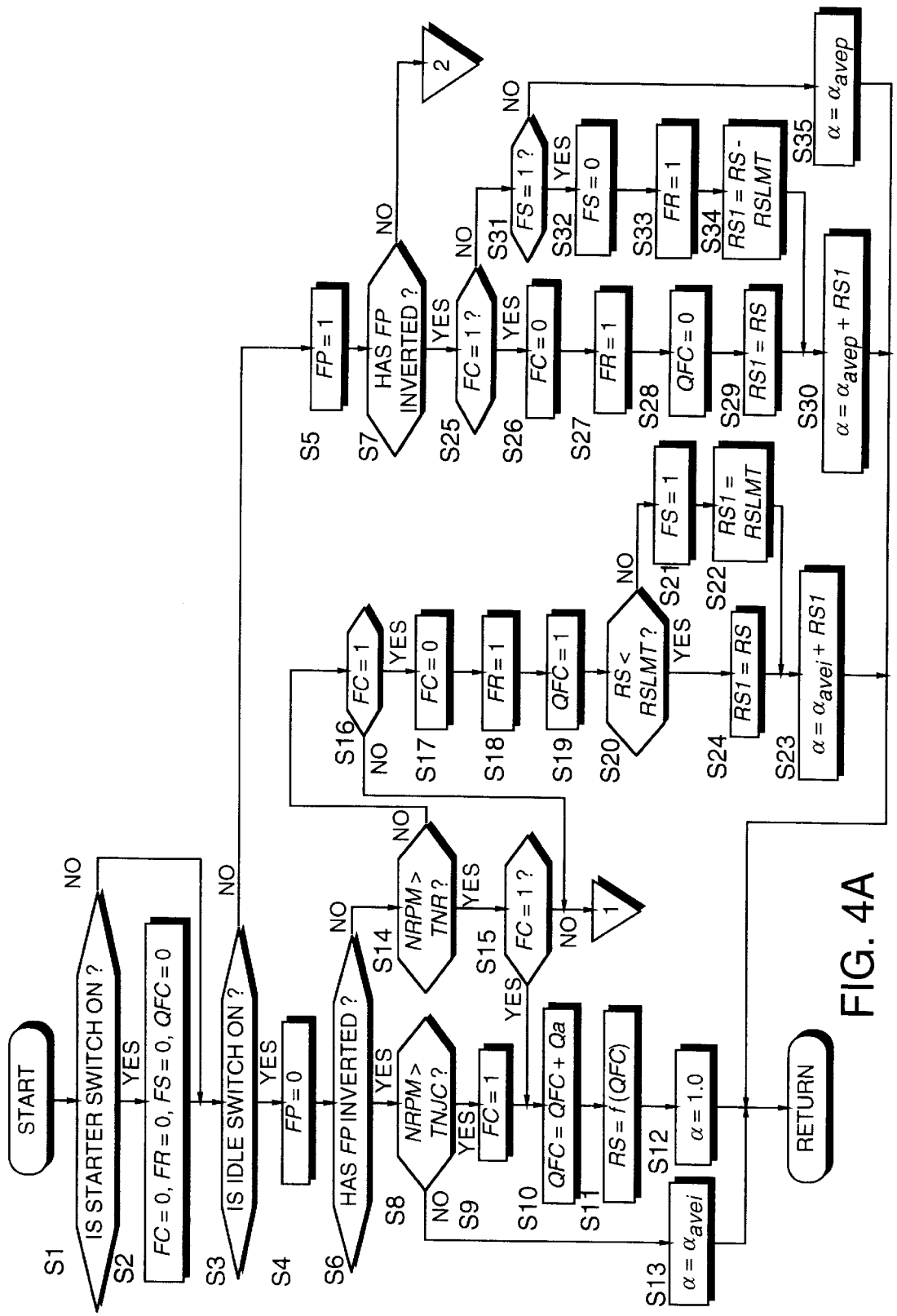
FIGS. 4A, 4B are flowcharts describing a process for computing an air-fuel ratio feedback correction coefficient $\alpha$ performed by a control unit according to this invention.

Next, the air-fuel ratio control routine performed by the control unit 2 will be described referring to the flowcharts of FIGS. 4A and 4B. This routine is performed whenever a REF signal is input from the crank angle sensor 4.

In a step S1, it is determined whether or not a starter switch 15 is ON based on the input signal from the starter switch 15. When the starter switch 15 is ON, the engine 1 is starting up. In this case, in a step S2, three flags FC, FR and FS and the cumulative intake air amount QFC during fuel cut are initialized and the routine proceeds to a step S3. These flags will be described later.

When the starter switch 15 is OFF, the routine proceeds to the step S3 from the step S1.

In the step S3, it is determined whether or not the input signal from the idle switch 12 is ON. When the idle switch 12 is ON, i.e. when the engine 1 is in an idle running state, an idle flag FP is reset to 0 in a step S4 and the routine proceeds to a step S6.

On the other hand when the idle switch 12 is OFF, the idle flag FP is reset to 1 in a step S5 and the routine proceeds to a step S7. Subsequently, the value of the idle flag FP shows whether or not the engine 1 is in the idle state. The control unit 2 also has a function for storing the value of the idle flag FP on the immediately preceding occasion when the routine was executed.

In the step S6 and S7, the current value of FP is compared with the value of FP on the immediately preceding occasion to determine whether or not FP has inverted. Due to this determination, the routine distinguishes four cases as follows.

(1) Immediately after change-over from the non-idle state to the idle state
(2) When the idle state continues
(3) Immediately after change-over from the idle state to the non-idle state
(4) When the non-idle state continues (1) Immediately after change-over from the non-idle state to the idle state The determination of the step S6 is affirmative when idle flag FP has inverted from 1 to 0, i.e. immediately after the engine 1 changes over from the non-idle state to the idle state.

In this case, in a step S8, the rotation speed NRPM of the engine 1 is compared with the fuel cut permitted rotation speed TNJC. When NRPM>TNJC, a fuel cut permission flag FC is set to 1 in step S9. In a following step S10, the intake air amount Qa is added to the cumulative value QFC. In a step S11, the required richness RS is calculated referring to a map shown in FIG. 5 based on the cumulative value QFC. Until the required richness RS is updated by a new calculation, it is stored in the memory of the control unit 2.

Further, in a step S12, the air-fuel ratio feedback correction coefficient $\alpha$ is fixed at 1.0 and the routine is terminated. The above process corresponds to the processing performed at the time $t_1$ in FIGS. 2A–2H and FIGS. 3A–3H.

In the step S8, when NRPM≦TNJC, fuel cut is not performed. In this case, $\alpha$ is set to $\alpha_{avei}$ in step S13 and the routine is terminated. Herein, $\alpha_{avei}$ is the average value of $\alpha$ in the idle state. Specifically, it is a weighted average of $\alpha$ during fuel ratio feedback control performed in the immediately preceding idle state, and it is stored in the memory without being updated after the air-fuel ratio feedback control is terminated.

(2) When the idle state continues the determination of the step S6 is non-affirmative when the idle flag FP continues to be 0, i.e. when the engine 1 remains in the idle state. In this case, the engine rotation speed NRPM is first compared with a fuel recovery speed TNR in a step S14, and it is determined whether or not the fuel cut permission flag FC is 1 in a step S15 or S16.

When NRPM>TNR and FC=1, it shows that fuel cut conditions are continuing. In this case, the processing from the step S10 to the step S12 described above is performed and the routine is terminated. This process corresponds to the processing in the interval from the time $t_1$ to $t_2$ in FIGS. 2A–2H and the interval from the time $t_1$ to $t_3$ in FIGS. 3A–3H.

When NRPM≦TNR and FC=1, it shows that the engine rotation speed NRPM has fallen below the fuel recovery speed TNR during fuel cut. In this case, the routine proceeds to a step S17, and the fuel cut permission flag FC is reset to 0. In a following step S18, the rich control flag FR is reset to 1, the cumulative intake air amount QFC is reset to 0 in a step S19, and the routine proceeds to a step S20.

In the step S20, the required richness RS is compared with the limiting value RSLMT. The richness RS used here is the value stored in the memory of the control unit 2. If RS is equal to or greater than RSLMT, the routine proceeds to step S21, and the additional rich control flag FS is reset to 1. In the following step S22, the limiting value RSLMT is set as an applied richness RS1. Finally in step S23, a value obtained by adding the richness RS1 to the idle state average feedback correction coefficient $\alpha_{avei}$ is set as the air-fuel ratio feedback correction coefficient $\alpha$, and the routing is terminated.

The processing of the steps S22, S23 is performed to limit the value of the air-fuel ratio feedback correction coefficient $\alpha$ so that the output torque of the engine 1 does not produce a shock. The processing of the step S21 is performed to instruct the control unit 2 to undertake additional rich control to eliminate the excess oxygen adsorption amount in the three-way catalyst caused by the limitation of the air-fuel ratio feedback correction coefficient $\alpha$. This process corresponds to the processing at the time $t_5$ in FIGS. 3A–3H.

Conversely, when RS<RSLMT in the step S20, the routine proceeds to a step S24, and after the richness RS has been set to the applied richness RS1, the routine is terminated after performing the processing of the step S23.

When NRPM>TNR and FC=0, or when NRPM≦TNR and FC=0, it signifies that fuel cut is not being performed. In this case, in a step S36 and subsequent steps shown in FIG. 4B, air-fuel ratio control in the idle state is performed.

First, in a step S36, a proportional part PL of an updating amount of the air-fuel ratio feedback correction coefficient $\alpha$ in the rich direction and a proportional part PR of an updating amount of the air-fuel ratio feedback correction coefficient $\alpha$ in the lean direction are set as constants PLi, PRi for the idle state. An integral part IL of an updating amount in the rich direction is also set to a constant ILi for the idle state.

In step S37, it is determined whether or not the rich control flag FR is 1. When FR is not 1, i.e. when rich control is not being performed, an integral part IR of an updating amount of the air-fuel ratio feedback correction coefficient α in the lean direction is set equal to constant IRi for normal running in a step S38. The control from the time $t_6$ to $t_7$ in FIGS. 3A–3H is performed by this process.

On the other hand, when FR=1, i.e. when rich control is being performed, the integral part IR is set equal to a constant IRiR having a larger value than the constant IRi for normal running in a step S39.

There is no other step but the step S18 in which the rich control flag FR is set to 1 in the idle state. In other words, the rich control flag FR is set to 1 only when the fuel cut is terminated and fuel injection is resumed under rich control. Therefore, FR=1 in the step S37 only during the interval from the time $t_5$ to the time $t_6$ in FIG. 3H.

At the time $t_5$, the air-fuel ratio feedback coefficient α fluctuates largely to rich due to air-duel ratio rich control, but this rich air-fuel ratio must be terminated in a short time. This is why during the interval up to the time $t_6$ when the real air-fuel ratio OSRF changes to lean, the integral part IR in the lean direction is set to the value IRiR which is larger than the usual value.

According to this embodiment, different constants are set depending on the idle state or the non-idle state. To distinguish between the two, the letter i is appended to the idle state constant and the letter p is appended to the non-idle state constant.

In the following step S40, it is determined whether or not air-fuel ratio feedback control conditions hold. When air fuel ratio feedback control conditions do not hold, the rich control flag FR is reset to zero in a step S41, the air-fuel ratio feedback control coefficient α is set to 1.0 corresponding to the stoichiometric air-fuel ratio in a step S42, and the routine is terminated.

Air-fuel ratio feedback control conditions do hold except, for example, in the following cases.

This is when the engine 1 starts and cooling water temperature is low, when a fault is detected in the oxygen sensor 3, or when the rich/lean inversion period of the output of the oxygen sensor 3 is equal to or greater than a predetermined value. In all other cases, it is determined that air-fuel ratio feedback control conditions hold.

In this air-fuel ratio controller, to be able to perform air-fuel ratio control even in the idle state, the idle state is not included in the case where air-fuel ratio feedback control conditions do not hold.

When air-fuel ratio feedback control conditions hold in the step S42, the routine proceeds to a step S43, and the output signal OSRF of the oxygen sensor 3 is A/D converted and read. In a following step S44, this signal OSRF is compared with the slice level SLF.

If OSRF≧SLF, i.e. when the air-fuel ratio of the air-fuel mixture supplied to the engine 1 is rich, the air-fuel ratio flag F1 is set to 1 in a step S45. If on the other hand OSRF<SLF, i.e. when the air-fuel ratio of the air-fuel mixture supplied to the engine 1 is lean, the air-fuel ratio flag F1 is reset to 0 in a step S46. In the following steps, the combustion state of the engine 1 is represented by the value of this air-fuel ratio flag FR1.

In the next step S47, the present value of the air-fuel ratio flag F1 is compared with its value on the immediately preceding occasion, and is determined whether or not the air-fuel ratio flag F1 has changed.

i. When the flag F1 has not changed

When the air-fuel ratio flag F1 has not changed in the determination of the step S47, the value of air-fuel ratio flag F1 determined in a step S48.

When F1=0, i.e. when the real air-fuel ratio continues to be lean, the integral part IL is added in a step S49 to the air-fuel feedback coefficient α calculated on the immediately preceding occasion when the routine was performed to update α towards rich, and the routine is terminated. When on the other hand F1=1, i.e. when the real air-fuel ratio continues to be rich, the integral part IR is subtracted in a step S50 from the air-fuel ratio feedback coefficient α calculated on the immediately preceding occasion when the routine was performed to update α towards lean, and the routine is terminated.

ii. When the flag F1 has changed

When the air-fuel ratio flag F1 has changed in the determination of the step S47, the value of the air-fuel ratio flag F1 is determined in a step S51. When F1=0, i.e. when the real air-fuel ratio has changed from rich to lean, the routine proceeds to a step S52.

Herein, it is determined whether the engine 1 is in the idle state or non-idle state from the idle flag FP. When the routine has reached the step S52 from the step S36, it means that air-fuel ratio control is performed in the idle state, so the idle flag FP must be 0.

In this case, the weighted average value $\alpha_{avei}$ in the idle state is calculated in the steps S53, S54.

In the following description, the period during which the real air-fuel ratio changes from lean to rich and back to lean, or from rich to lean is referred to as the air-fuel ratio inversion cycle. Also, the lean continuation period or rich continuation period is referred to as a half-cycle. The air-fuel ratio feedback correction coefficient α varies largely in each half-cycle due to the proportional parts PL, PR as shown in FIGS. 2H and 3H. The control unit 2 is programmed to sample the value of α immediately before the inversion, and store them in a memory. The control unit 2 is further programmed to store the latest value of the air-fuel ratio feedback correction coefficient α in the memory.

In a step S53, the latest value of the air-fuel ratio feedback correction coefficient α stored in the memory is shifted to $\alpha_{Li}$ As this real air-fuel ratio has changed from rich to lean as determined in the step S51 by the routine performed on the immediately preceding occasion, the latest value of α stored in the memory is the leanest value of all the values of α supplied during the rich period, i.e. it is the smallest value.

In a step S54, the weighted average value $\alpha_{avei}$ of α is calculated by Equation (1) from $\alpha_{Li}$ and a value $\alpha_{ui}$ sampled a half-cycle ago. Herein, $\alpha_{ui}$ corresponds to the maximum value of α during the immediately preceding lean period.

$$\alpha_{avei} = k \cdot \alpha_{avei} + (1-k) \cdot \frac{\alpha_{ui} + \alpha_{Li}}{2} \qquad (1)$$

Herein, $\alpha_{avei}$ on the right-hand side of Equation )1) is a weighted average value calculated when the immediately preceding routine was performed, and $\alpha_{avei}$ on the left-hand side of Equation (1) is a weighted average value updated by the execution of the routine on the present occasion.

In the following step S57, when rich control was being performed, the rich control flag FR is reset to 0 to terminate the process.

In the step S58, α is updated by adding the proportional part PL to the latest air-fuel ratio feedback correction coefficient α, and the routine is terminated.

On the other hand, when the air-fuel ratio flag F1=1 in the step S51, i.e. when the real air-fuel ratio has changed from lean to rich, the routine proceeds from the step S51 to the step S59.

In the step S59, it is determined from the idle flag FP whether the engine 1 is in the idle state or the non-idle state.

When the routine has reached the step S59 from the step S36, it means that air-fuel ratio control is being performed in the idle state, so the idle flag FP must be 0.

In this case, in steps S60 and S61, the weighted average value $\alpha_{avei}$ of $\alpha$ in the idle state is calculated.

In the step S60, the latest value of the air-fuel ratio feedback correction coefficient $\alpha$ stored in the memory is shifted to $\alpha_{ui}$. As the real air-fuel ratio has changed from lean to rich as determined in the step S51 from the routine of the immediately preceding occasion, the latest value of $\alpha$ stored in the memory is the richest value of all the values of $\alpha$ supplied during the rich period, i.e. it is the largest value.

In the step S61, the weighted average value $\alpha_{avei}$ of $\alpha$ is calculated by Equation (1) using $\alpha_{ui}$ and the value $\alpha_{Li}$ sampled a half-cycle ago. $\alpha_{Li}$ corresponds to the minimum value of $\alpha$ in the rich period as described hereabove.

In step S64, $\alpha$ is updated by subtracting the proportional part PR from the latest air-fuel ratio feedback correction coefficient $\alpha$. After the processing, the routine is terminated.

The steps S55, S56, S62, S63 are steps to perform air-fuel ratio control in the non-idle state, and will be described later.

(3) Immediately after change over from the idle state to the non-idle state

The determination result of the step S7 is affirmative immediately after the idle flag FP has changed from 0 to 1, i.e. immediately after there has been a change from the idle state to the non-idle state. The routine proceeds to the step S25, and it is determined whether or not the fuel cut permission flag FC is 1.

i. When FC=1

This corresponds to the situation at the time $t_2$ in FIGS. 2A–2H, and the routine performs processing to release fuel cut in the steps S26–S28. This is identical to the processing performed in the previous steps S17–S19.

In the step S29, the required richness RS calculated in the step S11 during the idle state continuation period is set to the applied richness RS1. In this case, fuel cut release corresponds to a shift from the idle state to the non-idle state. As the accelerator pedal is depressed, i.e. the driver intends to increase the engine output, there is no problem if the output of the engine increases due to rich control. Therefore, the required richness RS necessary to eliminate excess adsorbed oxygen in the three-way catalyst is added to an average value $\alpha_{avep}$ of the fuel ratio feedback coefficient in the non-idle state in the step S30 as the applied richness RS1 without applying a limit. After this processing, the routine is terminated. $\alpha_{avep}$ is the weighted average value of $\alpha$ in air-fuel ratio feedback control in the non-idle state on the immediately proceeding occasion, and it is a value which, after the air-fuel ratio feedback control terminates, is stored in the memory without updating.

ii. When FC=0

This corresponds to the situation at the time $t_7$ in FIGS. 3A–3H. The routine proceeds to the step S31 where it is determined whether or not the additional rich control flag FS is 1.

When FS=1, the addition rich control flag FS is reset to 0 in the step S32, and the processing of steps S33, S34 is performed.

In the step S33, the rich control flag FR is set to 1.

In the step S34, a value obtained by subtracting the limiting amount RSLMT from the required richness RS determined in the step S24 in the idle state, is set to the richness RS1. In other words, the insufficiency of rich control in the idle state is compensated.

In the step S30, the richness RS1 determined in this way is added to the average value $\alpha_{avep}$ of the air-fuel ratio feedback coefficient in the non-idle state, and the routine is terminated.

In the step S33, the rich control flag FR is set to 1 to increase the integral part of the updating amount in the lean direction of the air-fuel ratio feedback control coefficient $\alpha$ after additional rich control.

When the additional rich control flag FS is not 1 in the step S31, the air-fuel ratio feedback correction coefficient $\alpha$ is set to $\alpha_{avep}$ in the step S35, and the routine is terminated.

(4) When the non-idle state continues

When the determination of the step S7 is non-affirmative, the state FP=1, i.e. the non-idle state is continuing. In this case, the routine proceeds to the step S65 in FIG. 4B.

The processing of the steps S65–S68 is similar to that of the steps S36–S39.

In the step S65, the proportional part PL of the updating amount in the rich direction and the proportional part PR of the updating amount in the lean direction of the fuel ratio feedback correction coefficient are set equal to constants PLp, PRp for the non-idle state. The integral part IL of the updating amount in the rich direction is also set equal to a constant ILp for the non-idle state.

In the step S66, it is determined whether or not the rich control flag FR is 1. When FR is not 1, i.e. when rich control is not being performed, the integral part IR of the updating amount in the direction of the air-fuel ratio feedback correction coefficient $\alpha$ is set equal to a constant IRp for normal operation in the non-idle state in the step S67, and the routine proceeds to the step S40. The aforesaid process corresponds to the processing performed after the time $t_3$ in FIGS. 2A–2H and after the time $t_8$ in FIGS. 3A–3H.

On the other hand, when FR=1, i.e. when rich control is being performed, the integral part IR is set equal to a constant IRpR having a value larger than the usual constant IRp for the non-idle state in the step S68, and the routine proceeds to the step S40.

FR=1 in the non-idle state if FR was set to 1 in the step S27 or step S33, therefore the processing of the step S68 is performed in the interval $t_2$–$t_3$ in FIGS. 2A–2H or the interval $t_7$–$t_8$ in FIGS. 3A–3H. This is in order to rapidly terminate a state wherein the air-fuel ratio feedback coefficient $\alpha$ is considerably biased to rich due to air-fuel ratio rich control at the time $t_2$ and additional rich control at the time $t_7$.

The processing of the step S40 and subsequent steps is essentially identical to the case where the idle state continues, but the determination results of the steps S52, S59 are always non-affirmative unlike the case where the idle state is continuing.

Therefore after the determination of the step S52, while the non-idle state continues, the routine proceeds to the step S55. Here, the latest value of the air-fuel ratio feedback correction coefficient $\alpha$ stored in the memory is shifted to $\alpha_{Lp}$.

The reason why the routine proceeds from the step S51 to the step S52 is that as the real air-fuel ratio has shifted from rich to lean, the value of $\alpha$ stored in memory is the leanest of all the values of $\alpha$ supplied during the rich period, i.e. it is the smallest value.

In the next step S56, the weighted average value $\alpha_{avep}$ of $\alpha$ is calculated by Equation (1) using $\alpha_{Lp}$ and $\alpha_{up}$ sampled a half-cycle ago. Herein, $\alpha_{up}$ corresponds to the maximum value of $\alpha$ during the immediately preceding lean period.

$$\alpha_{avep} = \kappa \cdot \alpha_{avep} + (1-k) \cdot \frac{\alpha_{up} + \alpha_{Lp}}{2} \qquad (2)$$

Subsequently in a step S57, if rich control was being performed, the rich control flag FR is reset to 0 to terminate it.

In a step S58, α is updated by adding the proportional part PL to the latest air-fuel ratio feedback correction coefficient α, and the routine is terminated.

On the other hand, if the determination of the step S59 has been performed while the non-idle state continues, the routine proceeds to the step S62.

Here, the latest value of the air-fuel ratio feedback correction coefficient α stored in the memory is shifted to $α_{up}$.

The reason why the routine proceeds from the step S51 to the step S59 is that as the real air-fuel ratio has shifted from lean to rich, the value of α stored in memory is the richest of all the values of α supplied during the lean period, i.e. it is the largest value.

In the step S63, the weighted average value $α_{avep}$ of α is calculated by Equation (2) using $α_{up}$ and $α_{Lp}$ sampled a half-cycle ago. Herein, $α_{up}$ corresponds to the minimum value of α during the immediately preceding rich period.

After calculating the weighted average value $α_{avep}$ in this way, the routine updates α in the step S64 by subtracting the proportional part PR from the latest air-fuel ratio feedback correction coefficient α, and the routine is terminated.

The control unit 2 calculates an injection pulse width of the fuel injector 7 by the next equation 3 using the air-fuel ratio feedback correction coefficient α calculated by the above routine.

$$Ti = (Tp + Kathos) \cdot Tfbya \cdot (α + KBLRC - 1) \cdot 2 + Ts \qquad (3)$$

where, Tp=basic injection pulse width,
Kathos=transient correction amount,
Tfbya=target air-fuel ratio,
KBLRC=air-fuel ratio learning value, and
Ts=ineffectual pulse width.

Equation (3) is an equation for calculating the fuel injection amount in the case of sequential injection performed in each cylinder of a multi-cylinder engine, and is known for example from U.S. Pat. No. 5,615,660, however in this document, αm is given instead of KBLRC as the air-fuel ratio learning value. A fuel amount corresponding to the injection pulse width Ti calculated in this way is injected into each cylinder from the fuel injector 7 with an injection timing of once every time the engine 1 performs two revolutions.

The transient correction amount Kathos in Equation (3) is a correction amount for wall flow. The target air fuel ratio Tfbya is a value for increasing the fuel amount such as when the engine (3) is starting cold, and takes a value of 1.0 when no increase is applied. The learning value KBLRC is a value calculated based on α, and the ineffectual pulse width Ts is a value showing a valve opening delay of the fuel injector 7.

As described above, according to this air fuel ratio controller, when fuel cut is terminated due to decreased rotation speed of the engine 1 in the idle state, the air fuel ratio is rich controlled within limits based on the limiting value RSLMT. Therefore, even when fuel cut continues for a long time, the air-fuel ratio does not become excessively rich, and fluctuations of output torque of the engine 1 due to richness of the air-fuel ratio can be suppressed.

Further, fuel which was not injected due to this limitation of rich control is injected by additional rich control when the accelerator pedal is depressed. Excess adsorbed oxygen on the three-way catalyst remaining due to this limitation of rich control is quickly used to oxidize hydrocarbons HC and carbon monoxide CO which increase due to additional rich control, and the excess oxygen is eliminated in a short time.

Therefore, NOx reduction performance of the three-way catalyst which was lost due to excess oxygen is maintained at a suitable level.

Next, a second embodiment of this invention will be described referring to FIGS. 6A and 6B.

As described hereabove, the output signal OSRR of the oxygen sensor 13 downstream of the catalytic converter 10 represents the oxygen concentration in the catalytic converter 10. Specifically, when the output signal OSRR is below the slice level SLR, it indicates that the oxygen concentration in the catalytic converter 10 is excessive. According to this embodiment, when the output signal OSRR exceeds the slice level SLR, it is considered that discharge of excess oxygen adsorbed in the three-way catalyst due to fuel cut is complete, and additional rich control is not performed.

This assumes the following situation. Even if the richness of rich control due to release of fuel cut is limited and the amount of oxygen absorbed in the three-way catalyst has become excessive, there is always a possibility that the excess oxygen will disperse in the period before additional rich control is performed. In such a case, if additional rich control were then performed, not only would the additional amount of fuel be wasted, but the discharge amount of hydrocarbons HC and carbon monoxide CO due to unnecessary rich control would increase.

Figure 6A:
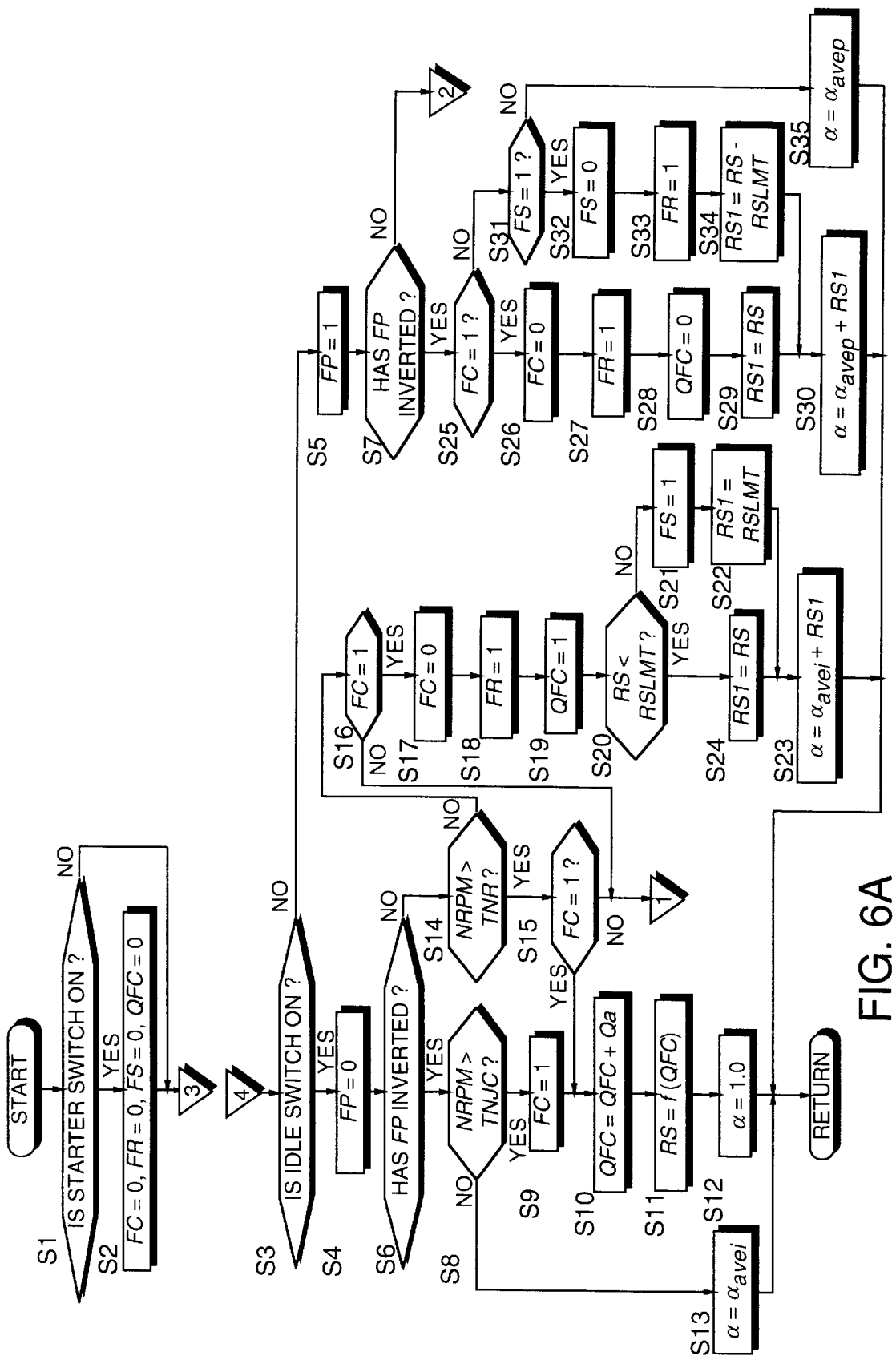
FIGS. 6A and 6B are flowcharts describing a process for computing the air-fuel ratio feedback correction coefficient $\alpha$ according to a second embodiment of this invention.
Figure 6B:
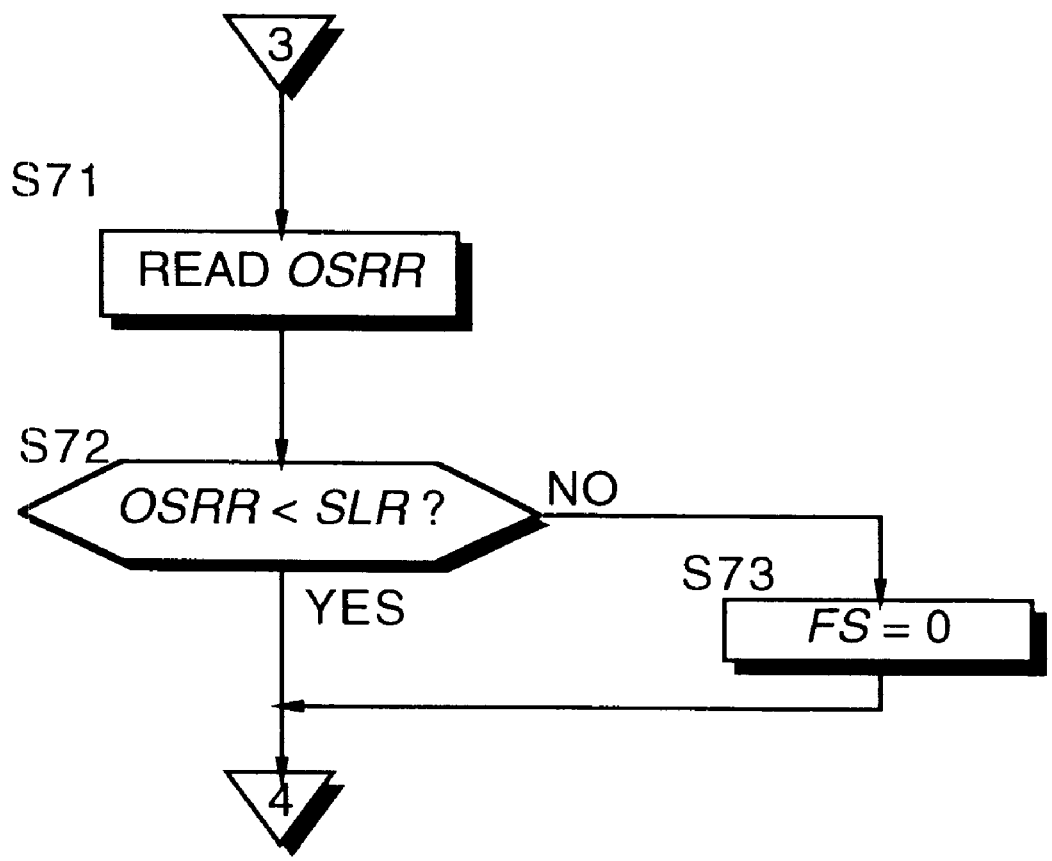

In this embodiment, the flowchart shown in FIG. 6B is interposed between the step S2 and step S3 as shown in FIG. 6A. The remaining construction of the flowchart is identical to that of the flowcharts of FIGS. 4A, 4B of the aforementioned first embodiment.

In the flowchart of FIG. 6B, firstly, the output signal OSRR of the oxygen sensor 13 is A/D converted and read in a step S71.

In a step S72, the output signal OSRR is compared with the slice level SLR. As a result, when OSRR is equal to or greater than SLR, it is determined that the excess oxygen in the catalytic converter 10 has been eliminated, and the additional rich control flag FS is reset to 0 in a step S73.

As a result, the determination result of the step S31 of FIG. 6A is always non-affirmative, and additional rich control is not performed by the steps S32–S34.

Next, a third embodiment of this invention will be described referring to FIGS. 7A–7C, FIG. 8 and FIGS. 9A–9L.

In this embodiment, an air-fuel ratio control process when the accelerator pedal has been slightly depressed in the idle state after release of fuel cut due to decrease of the rotation speed NRPM of the engine 1, is added to the flowchart of the second embodiment.

When the accelerator pedal is slightly depressed, the intake air amount of the engine 1 is less than when the accelerator pedal is largely depressed to produce an intended acceleration. In such a case, as the absolute fuel injection amount is small even if additional rich control is performed, the excess oxygen in the three-way catalyst cannot be eliminated.

Therefore according to this embodiment, additional rich control is performed each time the idle switch 12 is changed over until the output signal OSRR of the oxygen sensor 13 reaches the slice level SLR. Also, the applied richness RS1 of additional rich control is calculated based on the amount of hydrocarbons HC and carbon monoxide CO supplied to the catalytic converter 10 from the engine 1.

This control will be described referring to FIGS. 9A–9L.

At a time $t_5$ when fuel cut is terminated, the required richness RS depending on an intake air amount cumulative value during fuel cut is multiplied by the intake air amount Qa.

Next, during the period $t_5$–$t_6$, the value obtained by multiplying the difference between α and the weighted average $\alpha_{ave}$, during the idle state by the intake air amount Qa, is integrated over a fixed interval. This integral value QR is stored at $t_6$, which is the time when the rich control period finishes. Herein, the integral value QR represents the total amount of hydrocarbons HC and carbon monoxide CO supplied to the three-way catalyst 10 due to rich control. As the oxygen adsorbed by the three-way catalyst 10 is discharged when HC and CO are oxidized, the integral value QR then returns to a value corresponding to the cumulative discharge amount of adsorbed oxygen.

At a time $t_{11}$, when the accelerator pedal is slightly depressed and the idle switch 12 switches OFF, additional rich control is performed for the first time. In this case, a coefficient g is found by looking up a table prestored in the control unit 2, based on the stored integral value QR, and the additional rich control richness RS1 is determined by multiplying this coefficient g by the required richness RS.

Figure 8:
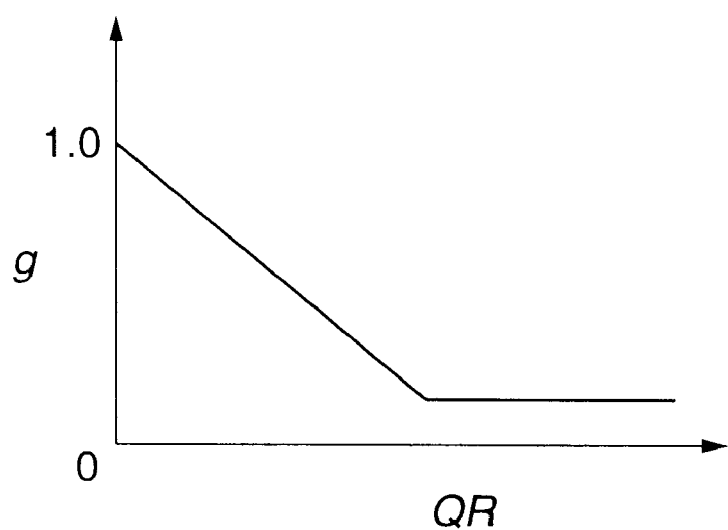
FIG. 8 is a diagram describing a table of a coefficient g stored by a control unit according to the third embodiment.

The contents of the table are shown in FIG. 8.

As can be seen from FIG. 8, the coefficient g becomes smaller the larger the integral value QR. A large integral value QR means that a large amount of adsorbed oxygen is discharged from the three-way catalyst, therefore, the applied richness RS1 of additional rich control is made smaller the larger the integral value QR.

After the first additional rich control is started and until a time $t_{12}$ when the real air-fuel ratio changes to lean, the following processing is performed each time the routine is executed. The difference between the air fuel ratio feedback correction coefficient $\alpha$ and the weighted average value $\alpha_{avep}$ of $\alpha$ in the non-idle state stored in the memory, is multiplied by the intake air amount Qa, and the value obtained is integrated. This integral value represents the total amount of adsorbed oxygen discharged by the three-way catalyst during the period from the time when additional rich control begins on the first occasion to when the real air-fuel ratio changes to lean at the time $t_{12}$.

After the time $t_{12}$, the idle switch 12 switches ON due to increase of the engine rotation speed NRPM. At a time $t_{13}$, the accelerator pedal is again slightly depressed and the idle switch switches OFF, so the additional rich control is performed for the same time.

In this case, the coefficient g is found by looking up the aforementioned table based on the integral value QR at the time $t_{12}$, and a value obtained by multiplying this coefficient g by the required richness RS used on the first occasion that additional rich control was performed, is used as the applied richness RS1 on the second occasion when additional rich control is performed. The coefficient g on the second occasion when additional rich control is performed, is smaller by the amount that the integral value QR has increased compared to the time when additional rich control was started on the first occasion, hence the applied richness RS1 is also a smaller value than the value on the first occasion of additional rich control.

Integration of the integral value QR is also performed during the period from the time $t_{13}$ to the time $t_{14}$ when the real air-fuel ratio changes to lean, in the same way as during the period $t_{11}$–$t_{12}$.

However, additional rich control is no longer performed when the output signal OSRR from the oxygen sensor 13 reaches the slice level SLR at a time $t_{16}$.

Next, the above control process will be described referring to the flowcharts of FIGS. 7A–7C.

Figure 7A:
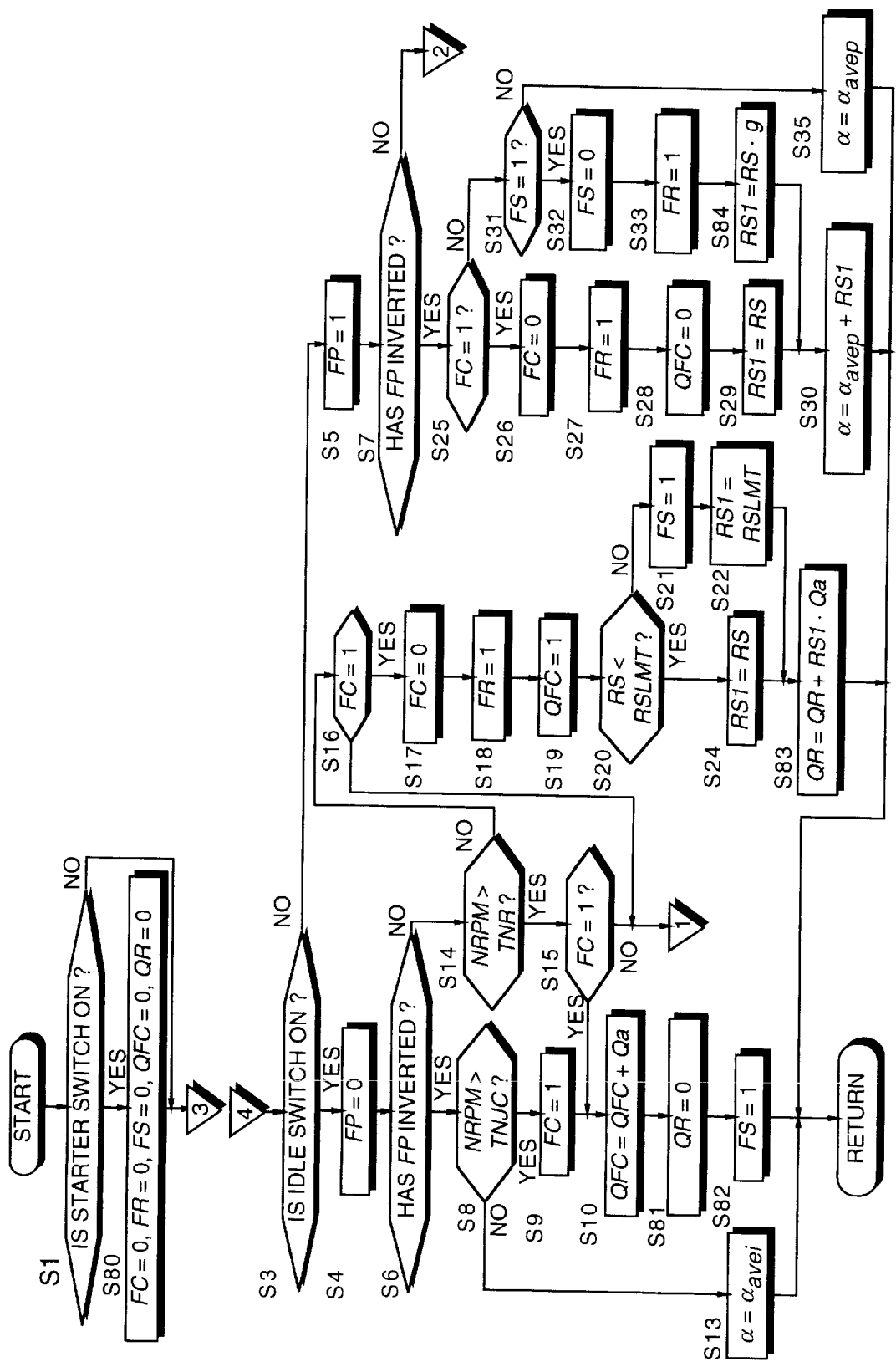
FIGS. 7A–7C are flowcharts describing a process for computing the air-fuel ratio feedback correction coefficient $\alpha$ according to a third embodiment of this invention.
Figure 7B:
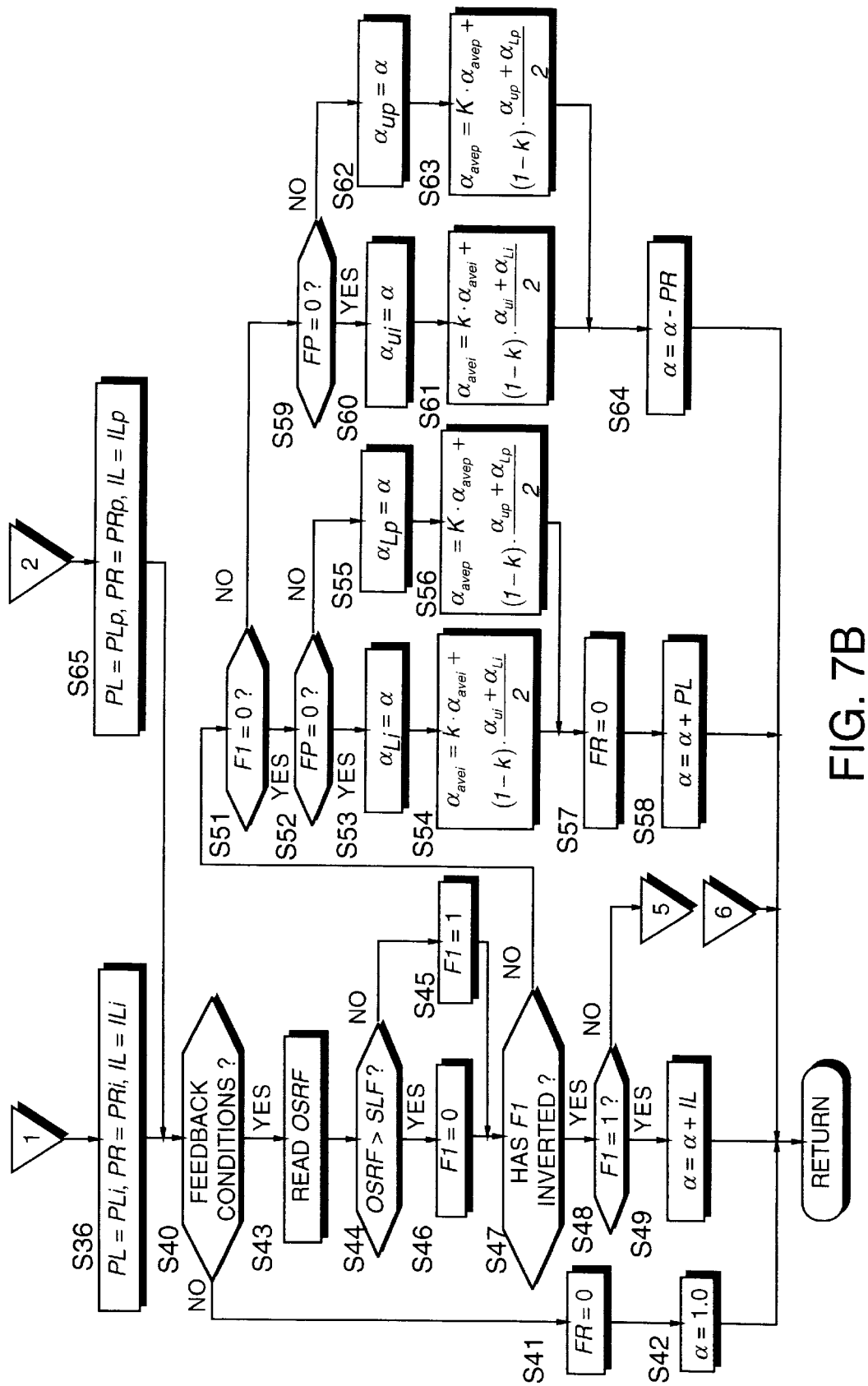

Firstly, in FIG. 7A, a step S80 is provided instead of the step S2 of the above first embodiment. The step S80 resets the above integral value QR in addition to the processing of S2. Steps S71 to S73 are provided between the steps S80 and S3 as in the above second embodiment.

Steps S81 and S82 are provided after the processing of the steps S10–S12 concerning fuel cut. In the step S81, the integral value QR is reset, and in the step S82, the additional rich control flag FS is set to 1. Also, the step S21 for setting the additional rich control flag F2 to 1 and the step S32 for resetting the additional rich control flag FS to 0 in FIG. 4A, are deleted.

A step S83 is provided after the step S23 and step S30 for determining the air-fuel ratio feedback correction coefficient $\alpha$ when fuel injection is resumed under rich control.

In the step S83, the integral value QR is updated by Equation (4).

$$QR = QR + RS1 \cdot Qa \qquad (4)$$

A step S84 is provided instead of the step S34 for determining the richness RS of additional rich control. In the step S84, the applied richness RS1 is determined from the product of the coefficient g found from the table and the required richness RS as described above.

Figure 4B:
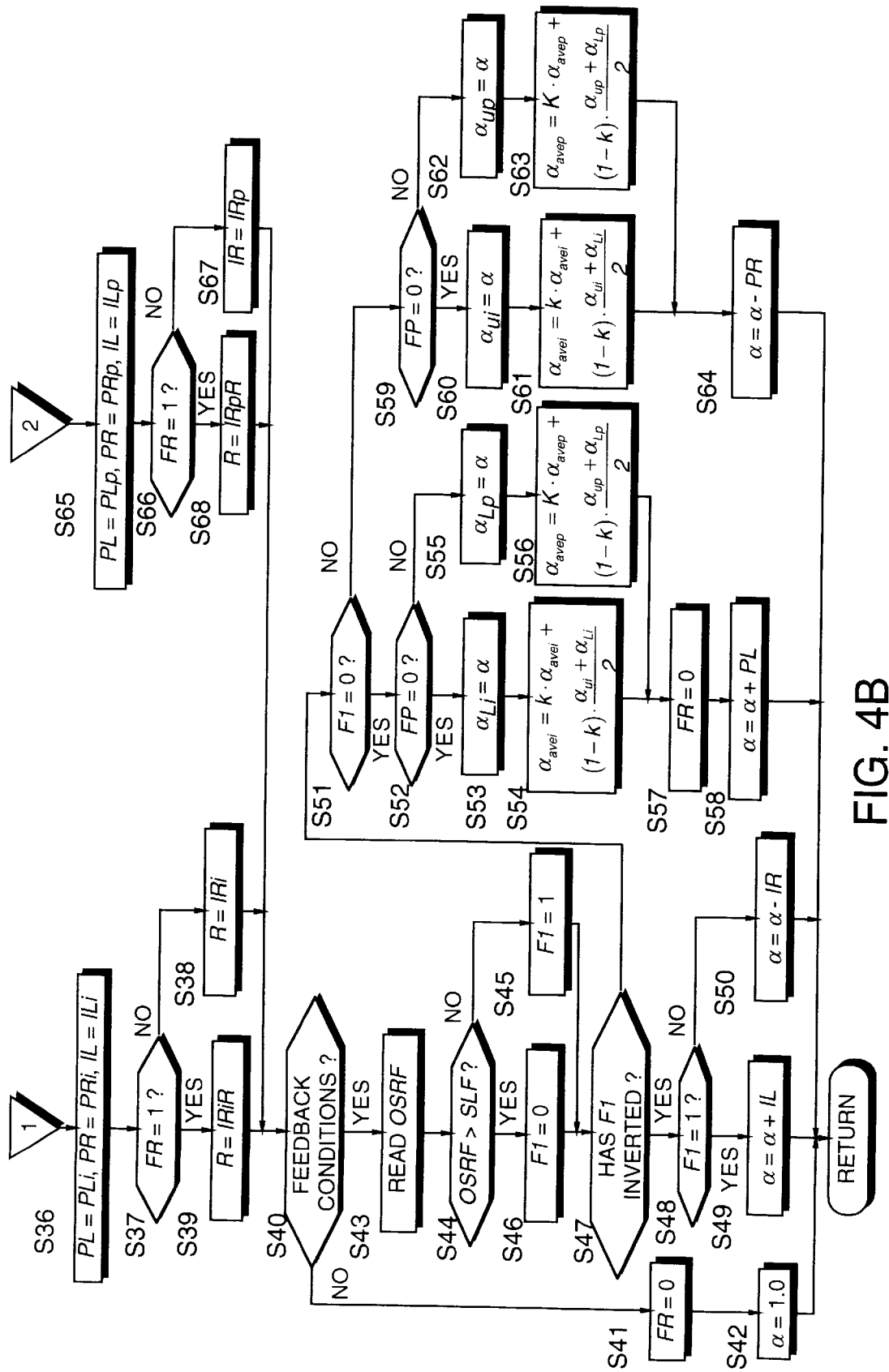
Figure 7C:
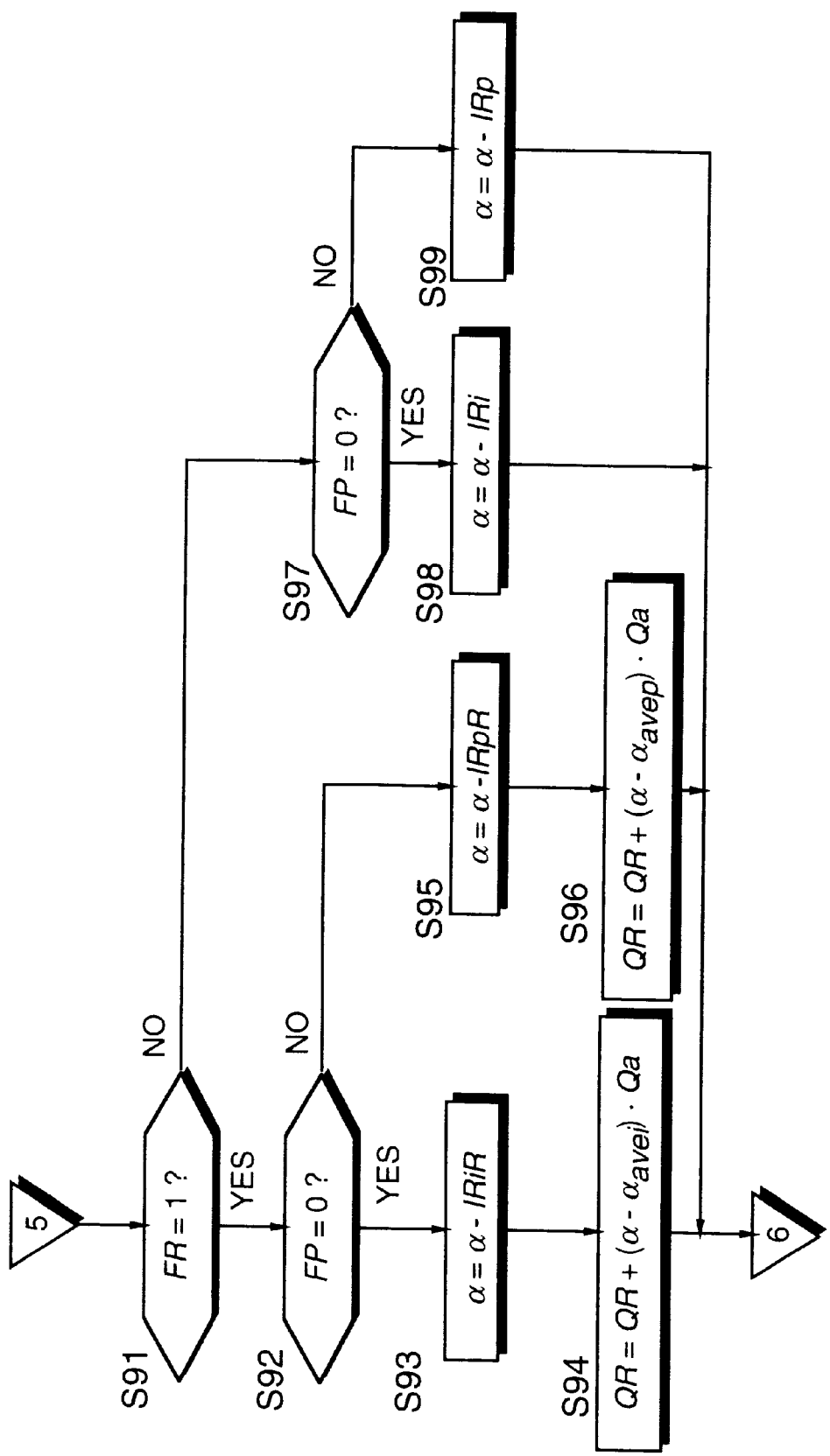

Further, the steps S27–S39 and S66–S68 of FIG. 4B are deleted, and the steps S91–S99 shown in FIG. 7C are provided instead of the step S50.

This is a process to determine the air-fuel ratio feedback correction coefficient $\alpha$ and the integral value QR when the real air-fuel ratio is rich in the idle state.

In a step S91, firstly, it is determined whether or not the rich control flag FR is 1. The routine proceeds to the step S91 when fuel cut is not performed and the real air-fuel ratio continues to be rich. Therefore, if FR=1, it means that the real air-fuel ratio is in a state of changing over to lean from rich. If FR is not 1, it means that ordinary air-fuel ratio feedback control is being performed.

When FR is not 1, it is determined in a step S97 whether or not the idle flag FP is 0.

In a step S98, the air-fuel ratio feedback correction coefficient $\alpha$ is updated using the integral part IRi of the updating amount in the lean direction in the idle state.

When the idle flag FP is not 0, i.e. in the non-idle state, the air-fuel ratio feedback correction coefficient $\alpha$ is updated in a step S99 using the integral part IRp of the updating amount in the lean direction in the non-idle state.

When FR=1 in the step S91, it is determined in a step S92 whether or not the idle flag FP is 1.

When the idle flag FP is 0, i.e. in the idle state, the air-fuel ratio feedback coefficient $\alpha$ is updated in a step S93 using a larger value IRiR than usual of the integral part IR of the updating amount of $\alpha$ in the lean direction in the idle state. Further, in a step S94, the difference between the updated air-fuel ratio feedback correction coefficient $\alpha$ and the weighted average value $\alpha_{avei}$ of $\alpha$ in the idle state stored in memory is multiplied by the intake air amount Qa, and the integral value QR is updated by the value obtained.

When the idle flag FP is not 0, the air-fuel ratio feedback coefficient $\alpha$ is updated in a step S95 using a larger value IRiR than usual of the integral part IR of the updating amount of $\alpha$ in the lean direction in the non-idle state. Further, in a step S96, the difference between the updated air-fuel ratio feedback correction coefficient $\alpha$ and the weighted average value $\alpha_{avei}$ of $\alpha$ in the non-idle state stored in the memory, is multiplied by the intake air amount Qa, and the integral value QR is updated by the value obtained.

According to this embodiment, there is no step S32 as there was in the aforesaid first and second embodiments, so there is no limit on the number of times additional rich control is performed, and additional rich control is performed until the output signal OSRR of the oxygen sensor 13 reaches the slice level SLR.

Also, the applied richness RS1 of additional control is set according to the total amount of hydrocarbons HC an carbon monoxide CO supplied after the first rich control. Hence, the atmosphere in the catalytic converter 10 can be optimized in a short time without excess or deficiency of oxygen adsorbed on the three-way catalyst.

In the aforesaid embodiments, the oxygen amount absorbed by the three-way catalyst was found from only the intake air amount Qa and cumulative value QFC during fuel cut, however the real oxygen adsorption amount is different depending on the oxygen adsorption amount prior to fuel cut and the degree of deterioration of the catalyst.

Nevertheless, in the third embodiment, additional rich control is not performed when the output signal OSRR of the oxygen sensor 13 reaches the slice level SLF, so the atmosphere in the catalytic converter 10 can be accurately returned to its state prior to fuel cut.

Next, a fourth embodiment of this invention will be described referring to FIGS. 10A–10B and FIGS. 11A–11B.

If fuel cut is released due to a decrease of the engine rotation speed NRPM, when rich control is first performed while limiting the richness RS as described in the above embodiments, and it is attempted to perform additional rich control, the oxygen amount in the catalytic converter 10 still remains in excess during the idle state from initial rich control to when additional rich control is performed.

Therefore, according to this embodiment, the air fuel ratio during the idle control period between initial rich control and additional rich control is also shifted toward rich. In this way, the NOx discharge amount from rich control to additional rich control is suppressed, and the oxygen amount in the catalytic converter 10 is returned to optimum as soon as possible. This air-fuel ratio control will be described referring to FIGS. 11A–11R.

FIGS. 11A–11L correspond to the aforesaid first embodiment, and FIGS. 11M–11R correspond to the aforesaid second embodiment.

The period from the time $t_6$ to $t_7$ of FIGS. 11A–11L, and the period from the time $t_0$ to $t_{21}$ of FIGS. 11M–11R, correspond to the aforesaid ordinary idle control period. During this period, special constants PLiR, PRiR are used instead of the constants PLi. PRi used as proportional parts of the updating amount of the air-fuel ratio feedback correction coefficient α in the ordinary idle state. Here, PLiR>PLi and PRiR<PRi.

By using these proportional parts PLiR, PRiR, the air-fuel ratio is shifted to rich overall. This is because by making PLiR larger than PLi and making PRiR smaller than PRi, the air-fuel ratio feedback correction coefficient α increases overall, and the fuel amount is increased correspondingly.

Next, the above control process will be described referring to the flowchart of FIGS. 10A and 10B. This flowchart is used instead of the flowchart of FIG. 4B which was used in the first and second embodiments.

Describing the differences from the flowchart of FIG. 4B, the integral part IL for updating in the rich direction is set equal to an idle state constant ILi in a step S101 as in the step S36 in the idle state when fuel cut is not being performed. The difference here is that unlike the step S36, setting of the proportional parts PLi, PRi is not performed.

Next, as in the first embodiment, the integral part IR of the updating amount in the lean direction is set in the steps S37–S39, and in a step S102, is determined whether or not the additional rich control flag is 1.

When FS is not 1, i.e when additional rich control is not performed, the proportional parts PL, PR of the updating amount are set to the ordinary idle state constants PLi, PRi in a step S103.

On the other hand, when FS=1, i.e. when additional rich control is performed, the proportional part PL is set equal to the constant PLiR which is larger than the ordinary idle state constant PLi and the proportional part PR is equal to the constant PRiR which is smaller than the ordinary idle state constant PRi in a step S104. By setting the proportional part PL larger than the proportional part PR, the air-fuel ratio is shifted to rich.

Figure 10A:
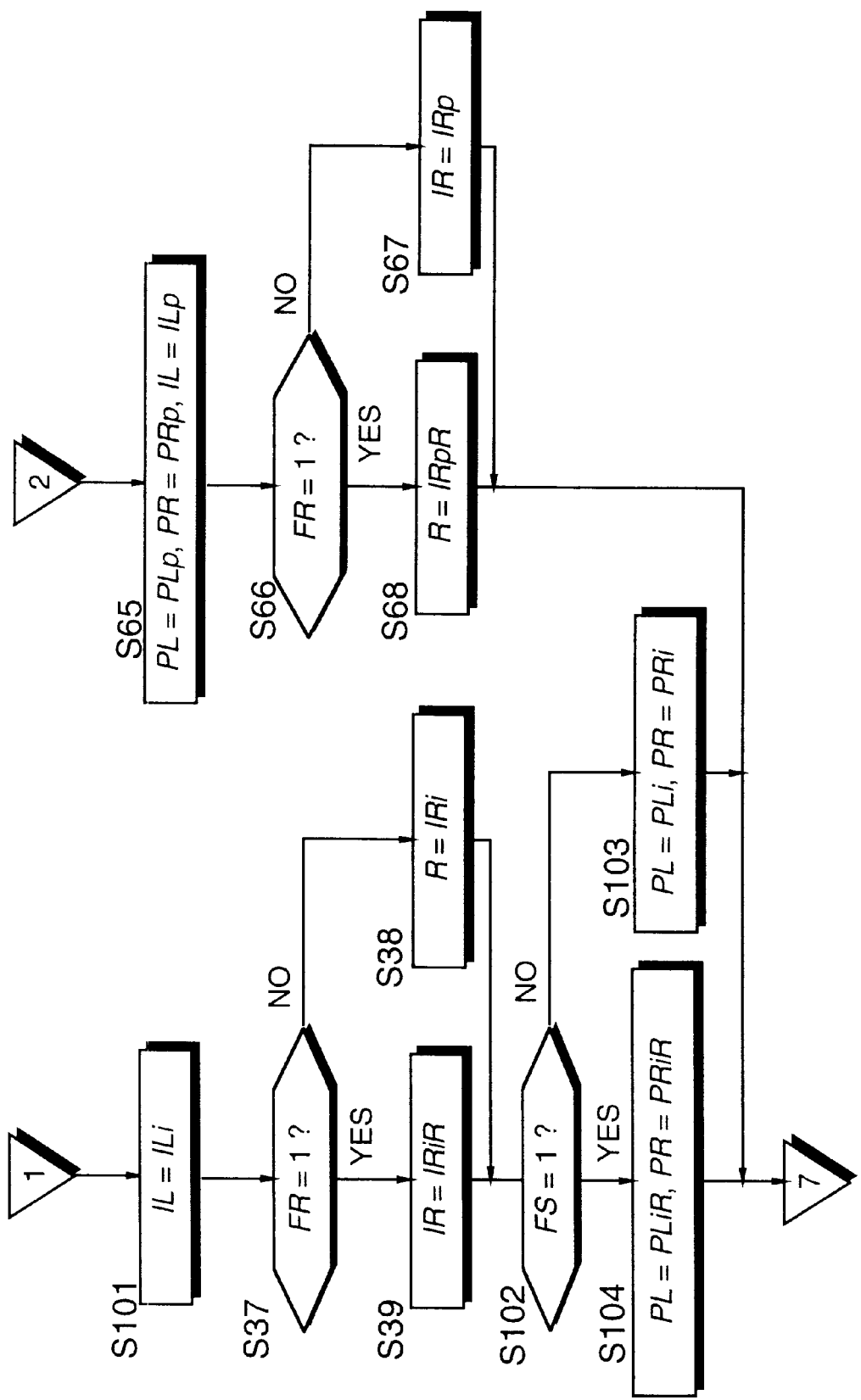
FIGS. 10A, 10B are flowcharts describing a process for computing the air-fuel ratio feedback correction coefficient $\alpha$ according to a fourth embodiment of this invention.
Figure 10B:
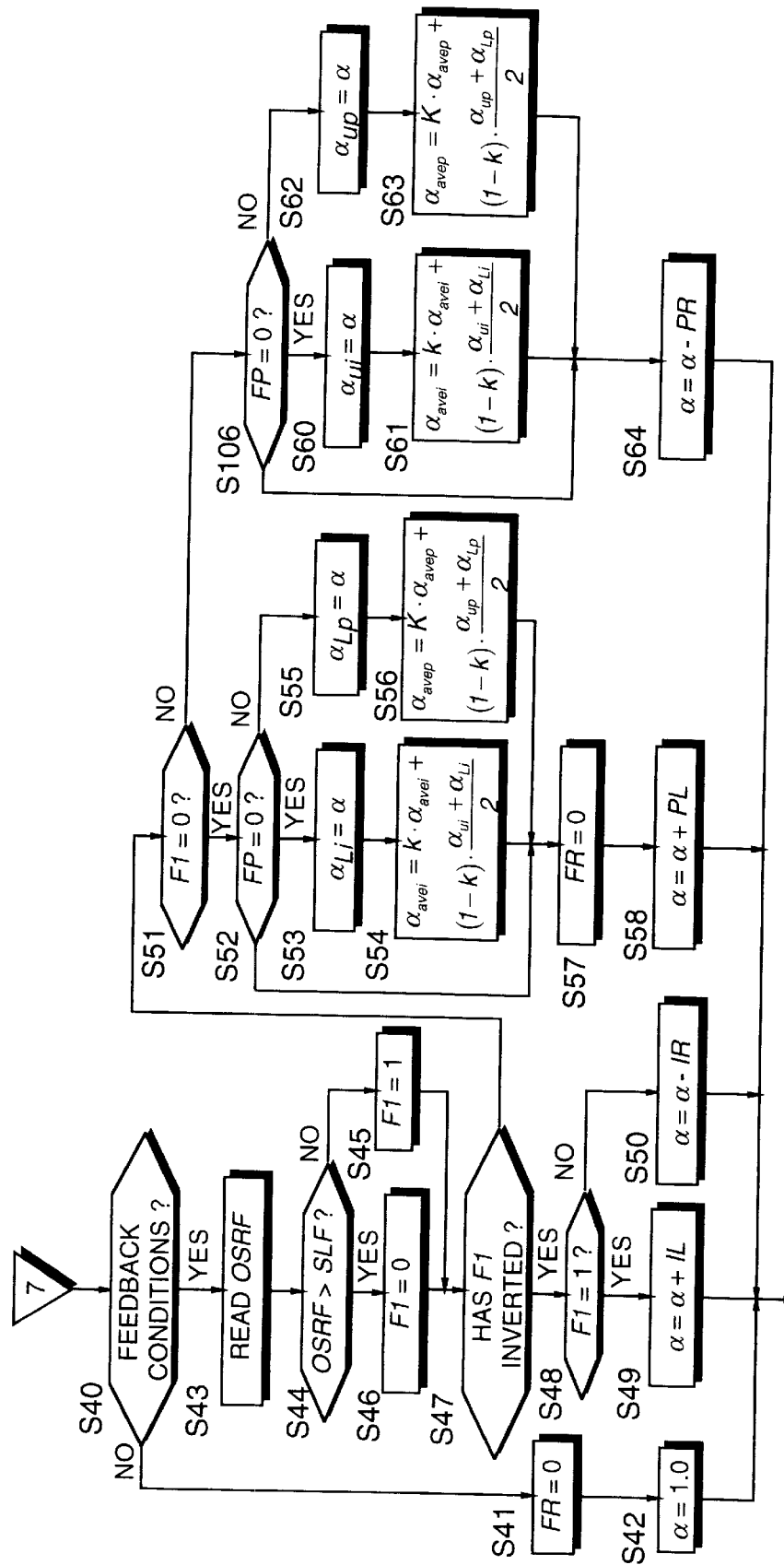

In the FIG. 10B, before calculating the weighted average value of the air-fuel ratio feedback correction coefficient α, it is determined whether or not the air fuel ratio is shifted to rich by providing steps S105, S106. When it is so shifted, the routine skips the steps S52–S54 and proceeds to the step S57, or skips the steps S59–S61 and proceeds to the step S64, so that calculation of the weighted average value of α is not performed.

After initial rich control, FS=1 only during the idle state period until additional rich control is performed, so this process has no effect on the calculation of the weighted average value of the air-fuel ratio feedback correction coefficient α in the non-idle state. According to this embodiment, the air-fuel ratio is shifted to rich during the ordinary idle control period between rich control and additional rich control, so the oxygen concentration in the catalytic converter 10 may rapidly be returned to an optimum state for catalyst activity. Further, the increase in the discharge amount of nitrogen oxides NOx is suppressed in the period from rich control to additional rich control.

If the oxygen in the catalytic converter 10 is excessive during the idle control period from initial rich control to additional rich control, the emission of nitrogen oxides (NOx) is large in this period. In this idle control period, when load due to the driving of accessories, e.g. an air conditioner, increases, the exhaust gas volume also increases and the total emission of nitrogen oxides (NOx) then becomes too large to be ignored.

Since this embodiment shifts the air-fuel ratio towards rich during the ordinary idle control period between the initial rich control and the additional rich control, it is possible to suppress the increase in the emission of nitrogen oxides (NOx) during this period.

Finally, a fifth embodiment of this invention will be described referring to FIGS. 12A, 12B and FIGS. 13A–13P.

In the aforesaid fourth embodiment, the air-fuel ratio was shifted to rich during the period from initial rich control to additional rich control, however, if additional rich control is performed on multiople occasions as in the third embodiment, the catalytic converter 10 may be in an excess oxygen state during a period from an additional rich control to be the next additional rich control, and the excess oxygen in this case also leads to an increase of NOx discharge amount.

In this embodiment, in addition to the ordinary idle control period between rich control and additional rich control of the fourth embodiment, the air-fuel ratio is shifted to rich also during an ordinary idle control period between one additional rich control and the next additional rich control.

This embodiment will be described referring to FIGS. 13A–13P. This timing chart corresponds to FIGS. 9A–9L.

In FIGS. 13A–13P, the ordinary air fuel ratio control period between one additional rich control and the next additional rich control is the period from $t_{12}$ to $t_{13}$. In this period, the idle switch is ON from the time $t_{31}$ to the time $t_{13}$.

The period from the time $t_0$ to $t_{11}$ is the idle control period from initial rich control to additional rich control.

According to this embodiment, the air-fuel ratio is shifted to rich using the constants PLiR, PRiR for updating the air-fuel ratio feedback correction coefficient α during the period from the time $t_{31}$ to $t_{13}$, as it is during the period from the time $t_6$ to $t_{11}$.

The remaining period from the time $t_{12}$ to $t_{21}$ is the non-idle state, but the air-fuel ratio is shifted to rich in the same way even during this period.

Due to the shift of the air-fuel ratio to rich, hydrocarbons HC and carbon monoxide CO supplied to the three-way catalyst increase, and the integral value QR is calculated also during shift as during rich control or additional rich control.

Next, the above control process will be described referring to the flowchart of FIGS. 12A, 12B.

This flowchart is applied instead of the flowchart of FIGS. 10A, 10B which was used in the aforesaid fourth embodiment.

Figure 12A:
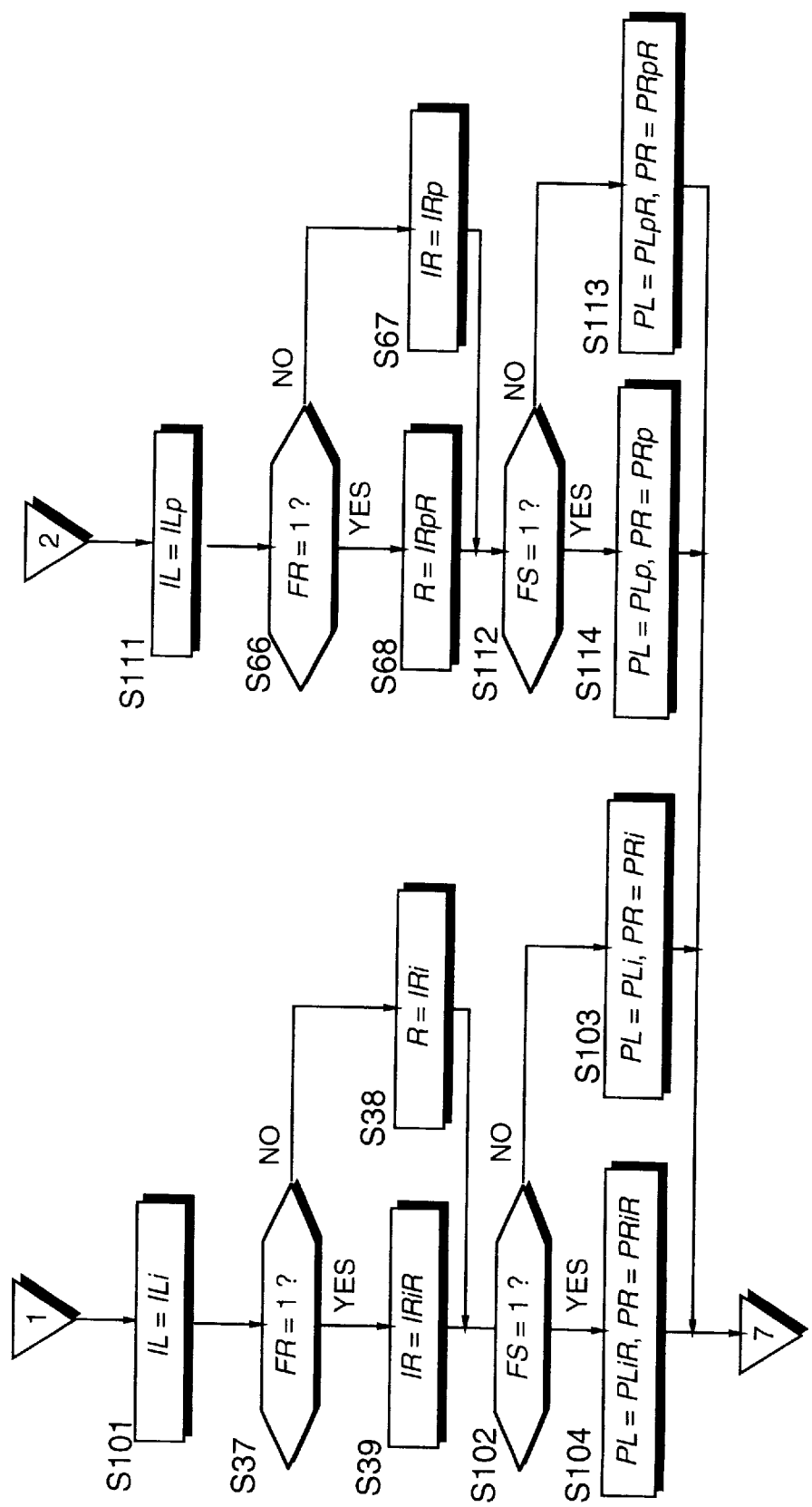
FIGS. 12A, 12B are flowcharts describing a process for computing the air-fuel ratio feedback correction coefficient $\alpha$ according to the fifth embodiment of this invention.

The difference of the flowchart of FIG. 12A from the flowchart of FIG. 10A is that a step S111 is provided instead of the step S65, and steps S111–S114 are provided after the steps S67, S68.

In the steps S111–S114, the same process as that of the steps S101–S104 is performed for the non-idle state. In other words, the integral part IL and proportional parts PL, PR of the updating amount of the air-fuel ratio feedback correction coefficient α for the non-idle state are set.

In the step S111, the integral part IL is set equal to an ordinary constant ILp for the non-idle state.

In the step S112, it is determined whether or not the additional rich control flag is 1.

Here, when fuel cut is performed in the idle state, the additional rich control flag FS is set to 1 in a step S82 of FIG. 7A and is reset to 0 when the output signal OSRR of the oxygen sensor 13 reaches the slice level SLR. Therefore, the condition FS=1 holds even during the non-idle state between additional rich control and the next additional rich control.

Even when FS=1 in the step S112, the proportional part PL is set equal to a constant PLpR larger than the ordinary constant PLp for the non-idle state in the step S114, and the proportional part PR is set equal to a constant PRpR smaller than the ordinary constant PRp for the non-idle state in the step 114. The air-fuel ratio is therefore shifted to rich even during the non-idle state period between additional rich control and the next additional rich control.

When the additional rich control flag FS is not 1 in the step S112, the proportional parts PL, PR are set equal to the ordinary non-idle state constants PLp, PRp in the step S113.

Figure 12B:
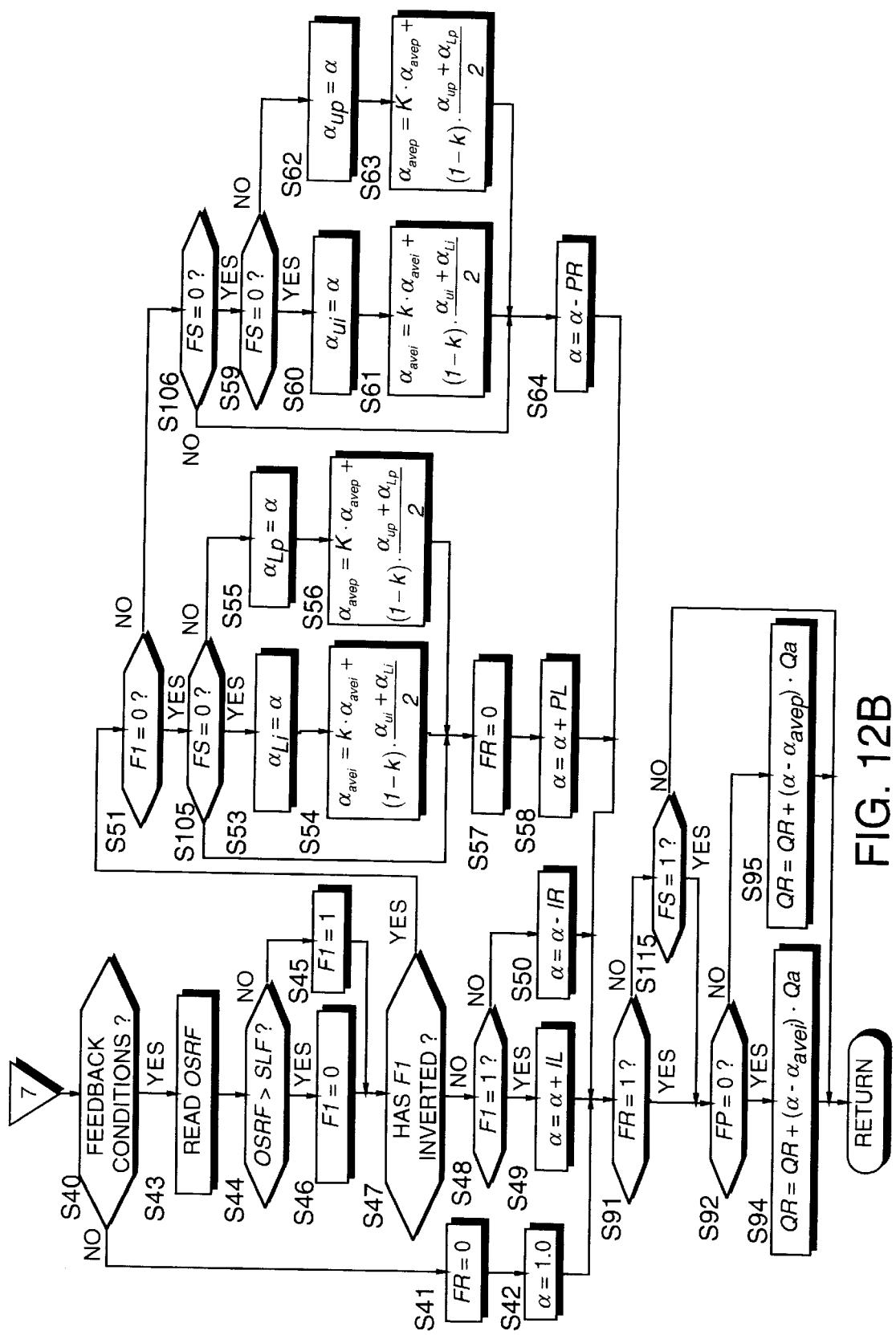

The difference between the flowchart of FIG. 12B and the flowchart of FIG. 10B is that steps S91–S96 identical to those of the third embodiment and a step S115 are provided at the end of the flow.

In this flowchart, calculation of the integral value is performed after the calculation of the air-fuel ratio feedback correction coefficient α.

First, it is determined whether or not the rich control flag FR is 1 in the step S91. When FR is 1, it is determined whether or not the idle flag FP is 1 in the step S92. When the idle flag FR is 1, in the step S94, the difference between the air fuel ratio feedback correction coefficient α and the weighted average value $\alpha_{avei}$ of α in the idle state stored in the memory, is multiplied by the intake air amount Qa, and the integral value QR is updated by the value obtained.

When FR is not 1, in the step S96, the difference between the air fuel ratio feedback correction coefficient α and the weighted average value $\alpha_{avep}$ of α in the non-idle state stored in memory, is multiplied by the intake air amount Qa, and the integral value QR is updated by the value obtained.

When the rich control flag FR is not 1 in the step S91, it is determined whether or not the additional rich control flag FS is 1 in the step S115. When FS=1, the processing after the step S92 is performed, and when FS is not 1, the routine is terminated. As seen from FIG. 13L, the additional rich control flag FS is 1 from when fuel cut is started to the time $t_{15}$ when the output signal OSRR of the oxygen sensor 13 reaches the slice level SLR, therefore the integral value QR is always updated during this interval.

In this way, according to this embodied, the air-fuel ratio is shifted to rich during the period from rich control until subsequent additional rich control is performed, and the air-fuel ratio is also shifted to rich between multiple periods of additional rich control, so excess oxygen in the catalytic converter 10 can be rapidly discharged. As a result, increased discharge of nitrogen oxides NOx is prevented.

Although the invention has been described above by reference to certain embodiments of the invention, the invention is not limited to the embodiments described above. Modifications and variations of the embodiments in light of the above teachings. For example, in the aforesaid embodiments, the oxygen adsorption amount of the three-way catalyst during fuel cut was calculated according to the intake air volume, but it may be calculated also based on the fuel cut continuation time.

The contents of Tokugan Hei 10-16867 with a filing date of Jan. 29, 1998, and Takugan Hei 10-61802 with a filing date of Mar. 12, 1998, respectively in Japan, are hereby incorporated by reference.

The embodiments of this invention in which an exclusive property or privilege is claimed are defined as follows:

What is claimed is:

1. An air-fuel ratio controller for use with an engine which performs combustion of a mixture of fuel injected from a fuel injector and air aspirated from an intake passage, wherein exhaust gas produced by combustion is purified by a catalytic converter comprising a three-way catalyst, said controller comprising:

a sensor for detecting whether or not said engine is running in an idle state, a sensor for detecting a rotation speed of said engine, and a microprocessor programmed to:

stop fuel injection from the fuel injector when the engine is in the idle state and the engine rotation speed exceeds a predetermined fuel cut permitted rotation speed, calculate an oxygen amount adsorbed on said three-way catalyst while said injection has stopped, increase the amount of fuel injected from said fuel injector when said fuel injection is resumed, by an increase amount according to said adsorbed oxygen amount, and limit said increase amount to a predetermined limiting value.

2. An air-fuel ratio controller as defined in claim 1, wherein said microprocessor is programmed to limit said increase amount to said predetermined limiting value on condition that the engine rotating speed falls below a predetermined fuel recovery speed while fuel injection is stopped.

3. An air-fuel ratio controller as defined in claim 1, wherein said fuel injector is a fuel injector for injecting a fuel amount depending on a pulse width of a pulse signal input from said microprocessor, said microprocessor is further programmed to control said pulse width so that the air-fuel ratio after increasing said fuel injection amount returns to a stoichiometric air fuel ratio at a predetermined rate, and said limiting value is specified by said pulse width.

4. An air-fuel ratio controller as defined in claim 1, wherein said controller further comprises a sensor for detecting an air-fuel ratio of said mixture, and said microprocessor is further programmed to calculate an air-fuel ratio feedback correction coefficient for correcting said fuel injection amount, calculate an average value of the air-fuel ratio feedback correction coefficient when said engine is running in a non-idle state, calculate a required richness according to said adsorbed oxygen amount, calculate a final correction coefficient by adding the smaller of the required richness and said limiting value to said average value, and control the fuel injection amount of said fuel injector based on said final correction coefficient.

5. An air-fuel ratio controller as defined in claim 1, wherein said microprocessor is further programmed to resume said fuel injection by said fuel injector when the engine is in the idle state and said engine rotation speed has fallen below a fuel recovery speed which is less than said fuel cut permitted rotation speed.

6. AN air-fuel ratio controller as defined in claim 5, wherein said microprocessor is further programmed to perform an additional increase of the fuel injection amount from said fuel injector after said fuel injection has resumed, when the engine has changed over from the idle state to a non-idle state.

7. An air-fuel ratio controller as defined in claim 6, wherein said controller further comprises a sensor for detecting an oxygen concentration in said catalytic converter, and said microprocessor is further programmed not to perform said additional increase when said oxygen concentration has decreased to the oxygen concentration of the exhaust gas produced from the mixture having a stoichiometric air-fuel ratio.

8. An air-fuel ratio controller as defined in claim 6, wherein said controller further comprises a sensor for detecting an air-fuel ratio of said mixture, and said microprocessor is further programmed to calculate an air-fuel ratio feedback correction coefficient for correcting said fuel injection amount such that said air-fuel ratio becomes a stoichiometric air-fuel ratio, calculate an average value of the air-fuel ratio feedback correction coefficient when said engine is running in the non-idle state, calculate a required richness according to said adsorbed oxygen amount, calculate a final correction coefficient by adding the smaller of the required richness and said limiting value to the average value, control the fuel injection amount of said fuel injector based on the final correction coefficient, and perform an additional increase of the fuel injection amount from said fuel injector after said fuel injection has resumed when the engine has changed over from the idle state to the non-idle state, based on the difference between said required richness and said limiting value.

9. An air-fuel ratio controller as defined in claim 6, wherein said fuel injector is a fuel injector which injects a fuel amount according to a pulse width of a pulse signal input from said microprocessor, and said microprocessor is further programmed to control said pulse width so that the air-fuel ratio returns to a stoichiometric air-fuel ratio at a predetermined rate after the additional increase of the fuel injection amount has been performed.

10. An air-fuel ratio controller as defined in claim 7, wherein said microprocessor is further programmed to perform said additional increase each time the engine changes over from the idle state to the non-idle state after said fuel injection is resumed, until said oxygen concentration decreases to the oxygen concentration of the exhaust gas produced from the mixture having the stoichiometric air-fuel ratio.

11. An air-fuel ratio controller as defined in claim 10, wherein said microprocessor is further programmed to integrate a total value of hydrocarbons and carbon monoxide supplied to said catalytic converter when said fuel injection amount is increased, and determine a fuel injection increase amount of said additional increase to be smaller the large the total value.

12. An air-fuel ratio controller as defined in claim 11, wherein said controller further comprises a sensor for detecting an air-fuel ratio of said mixture and a sensor for detecting an intake air amount of said engine, and said microprocessor is further programmed to calculate said total value based on the product of the fuel injection increase amount and said intake air amount during the additional increase of the fuel injection amount.

13. An air-fuel ratio controller as defined in claim 11, wherein said controller further comprises a sensor for detecting an air-fuel ratio of said mixture, and said microprocessor is further programmed to calculate an air-fuel ratio feedback correction coefficient for correcting said fuel injection amount so that said air-fuel ratio becomes said stoichiometric air-fuel ratio, calculate an average value of the air-fuel ratio feedback correction coefficient when the engine is running in the non-idle state, calculate a required richness according to said adsorbed oxygen amount, set a coefficient which decreases according to an increase of said total value, and determine said fuel injection increase amount by multiplying said required richness by said coefficient.

14. An air-fuel ratio controller as defined in claim 6, wherein said microprocessor is further programmed to shift the air-fuel ratio of said mixture to the rich side of a stoichiometric air-fuel ratio during the period after said fuel injection is resumed to when the engine changes over from the idle state to the non-idle state.

15. An air-fuel ratio controller as defined in claim 10, wherein said microprocessor is further programmed to shift the air-fuel ratio of said mixture to the rich side of the stoichiometric air fuel ratio during the period from when the additional increase of the fuel injection amount is performed to a time when the additional increase of the fuel injection amount is again performed.

16. An air-fuel ratio controller as defined in claim 15, wherein said microprocessor is further programmed to calculate a total value of hydrocarbons and carbon monoxide supplied to the catalytic converter due to the increase of the fuel injection amount, the additional increase of the fuel injection amount and the shift of the air-fuel ratio to rich, and modify the fuel injection amount on a next occasion of the additional increase to be lower the larger the total value.

17. An air-fuel ratio controller for use with an engine which performs combustion of a mixture of fuel injected from a fuel injector and air aspirated from an intake passage, wherein exhaust gas produced by combustion is purified by a catalytic converter comprising a three-way catalyst, said controller comprising:

means for detecting whether or not said engine is running in an idle state, means for detecting a rotation speed of said engine, and means for stopping fuel injection from the fuel injector when the engine is in the idle state and the engine rotation speed exceeds a predetermined fuel cut permitted rotation speed, means for calculating an oxygen amount adsorbed on said three-way catalyst while said injection has stopped, means for increasing the amount of fuel injected from said fuel injector when said fuel injection is resumed, by an increase amount according to said adsorbed oxygen amount, and means for limiting said increase amount to a predetermined limiting value.

18. An air-fuel ratio control method of an engine which performs combustion of a mixture of fuel injected from a fuel injector and air aspirated from an intake passage, wherein exhaust gas produced by combustion is purified by an catalytic converter comprising a three-way catalyst, said method comprising:

detecting whether or not said engine is running in an idle state, detecting a rotation speed of said engine, stopping fuel injection from the fuel injector when the engine is in the idle state and the engine rotation speed exceeds a predetermined fuel cut permitted rotation speed, calculating an oxygen amount adsorbed on said three-way catalyst while said injection has stopped, increasing the amount of fuel injected from said fuel injector when said fuel injection is resumed, by an increase amount according to said adsorbed oxygen amount, and limiting said increase amount to a predetermined limiting value.

* * * * *